(12) United States Patent
Takayama et al.

(10) Patent No.: US 12,219,977 B2
(45) Date of Patent: Feb. 11, 2025

(54) IMPROVER FOR CEREAL PROCESSED FOOD PRODUCT

(71) Applicants: MIZKAN HOLDINGS CO., LTD., Aichi (JP); MIZKAN CO., LTD., Aichi (JP)

(72) Inventors: Yuhei Takayama, Aichi (JP); Kenta Hagiwara, Aichi (JP); Riho Genma, Aichi (JP)

(73) Assignees: Mizkan Holdings Co., Ltd., Aichi (JP); Mizkan Co., Ltd., Aichi (JP)

( * ) Notice: Subject to any disclaimer, the term of this patent is extended or adjusted under 35 U.S.C. 154(b) by 656 days.

(21) Appl. No.: 17/423,715

(22) PCT Filed: Nov. 21, 2019

(86) PCT No.: PCT/JP2019/045542
§ 371 (c)(1),
(2) Date: Jul. 16, 2021

(87) PCT Pub. No.: WO2020/149004
PCT Pub. Date: Jul. 23, 2020

(65) Prior Publication Data
US 2022/0079198 A1 Mar. 17, 2022

(30) Foreign Application Priority Data
Jan. 18, 2019 (JP) .................. 2019-006665

(51) Int. Cl.
| | |
|---|---|
| A23L 27/00 | (2016.01) |
| A23L 5/20 | (2016.01) |
| A23L 7/109 | (2016.01) |
| A23L 7/196 | (2016.01) |
| A23L 27/10 | (2016.01) |
| A23L 27/20 | (2016.01) |

(52) U.S. Cl.
CPC ............. *A23L 27/88* (2016.08); *A23L 5/27* (2016.08); *A23L 7/109* (2016.08); *A23L 7/1965* (2016.08); *A23L 27/10* (2016.08); *A23L 27/2022* (2016.08); *A23L 27/2024* (2016.08); *A23L 27/2052* (2016.08); *A23V 2002/00* (2013.01)

(58) Field of Classification Search
CPC .. A23L 27/2052; A23L 27/2022; A23L 7/111; A23L 7/197; A23L 7/109; A23L 27/2024; A23L 5/27; A23L 7/1965; A23L 27/88; A23L 27/10; A23L 27/20; A23L 3/3544; A23L 3/3499; A23L 3/3535
See application file for complete search history.

(56) References Cited

U.S. PATENT DOCUMENTS

2017/0055548 A1 3/2017 Chakraborty et al.
2018/0303142 A1 10/2018 Hagiwara et al.

FOREIGN PATENT DOCUMENTS

| | | | | |
|---|---|---|---|---|
| CA | 2693762 | A1 * | 1/2009 | |
| CA | 3041812 | A1 * | 5/2018 | ............... A23B 4/01 |
| CN | 108024561 | A | 5/2018 | |
| EP | 3344069 | A1 | 7/2018 | |
| EP | 3360427 | A1 | 8/2018 | |
| JP | 2004-222550 | A | 8/2004 | |
| JP | 2007-53923 | A | 3/2007 | |
| JP | 2015-050988 | A | 3/2015 | |
| JP | 2018-526006 | A | 9/2018 | |
| KR | 20180048862 | A | 5/2018 | |
| KR | 2018-0071262 | A | 6/2018 | |
| WO | 2017/037181 | A1 | 3/2017 | |
| WO | 2017/068818 | A1 | 4/2017 | |

OTHER PUBLICATIONS

R. G. Buttery et al., "Volatile Flavor Components of Rice Cakes", J Agric. Food Chem., 1999, vol. 47, No. 10, pp. 4353-4356 (4 pages).
International Search Report issued in International Application No. PCT/JP2019/045542, dated Dec. 17, 2019 (2 pages).
Written Opinion issued in International Application No. PCT/JP2019/045542, dated Dec. 17, 2019 (4 pages).
Extended European Search Report issued in corresponding European Application No. 19909905.2 mailed Sep. 21, 2022 (9 pages).

* cited by examiner

*Primary Examiner* — Vera Stulii
(74) *Attorney, Agent, or Firm* — Osha Bergman Watanabe & Burton LLP

(57) ABSTRACT

An object of this disclosure is to provide a technique capable of suppressing decrease and deterioration of flavor and/or texture of a cereal processed food product over time after production as well as maintaining the flavor and/or the texture of the cereal processed food product. This disclosure further provides a technique capable of maintaining the flavor and/or the texture of a freshly made cereal processed food product even if the products are stored at room temperature or under a chilled state for a long period of time. This disclosure provides an improver for cereal processed food product containing maltol as a component (A) and at least one component selected from 5-Hydroxymethylfurfural, dimethyl sulfide, and 3-methylbutanal as a component (B).

12 Claims, No Drawings

IMPROVER FOR CEREAL PROCESSED FOOD PRODUCT

CROSS-REFERENCE TO RELATED APPLICATION

The present application is based on and claims priority to Japanese Patent Application No. 2019-006665, filed on Jan. 18, 2019, the disclosure of which is hereby incorporated by reference in its entirety.

TECHNICAL FIELD

This disclosure relates to an improver for cereal processed food products. In particular, this disclosure relates to an improver having a long-lasted effect on fresh flavor and/or texture of a cereal processed food product, a cereal processed food product that contains the improver and maintains its fresh flavor and/or texture, a method of producing such a cereal processed food product, and a method of maintaining its fresh flavor and/or texture of the cereal processed food product.

BACKGROUND ART

Recently, so-called "Ready-Made Meals" or "Home-Meal Replacement products" has become significantly popular since they require less cooking and are more affordable than eating out. That is, people purchase pre-cooked food such as side dishes and a bento at a grocery store or a convenience store and eat them at home.

It often takes a few or several hours for the customers to eat the pre-cooked food prepared as "Ready-Made Meals" after cooking. Therefore, in case of cooked rice for a bento, a rice ball, or the like, the flavor (e.g., smell, sweetness, and/or umami) and/or the texture (e.g., chewiness and/or stickiness) of freshly cooked rice decreases and deteriorates due to the lapse of time after producing or processing the cooked rice.

Because it takes time from producing or processing to eating cereal processed food products such as cooked rice (e.g., bento, rice ball) and noodles (e.g., pasta, soba, ramen), the flavor (e.g., smell, sweetness, and/or umami) and/or the texture (e.g., chewiness and/or stickiness) of freshly made cereal processed food products decreases and deteriorates. Further, these cereal processed food products are often stored and delivered at room temperature (15 to 25° C.) or under a chilled state (10° C. or less) for over several hours after production or processing thereof. In such a case, lipid oxidation and starch aging (β-starching) in the cereal processed food products further progress compared to storage and distribution thereof in a heat-retained condition. As a result, the decrease and deterioration of flavor and/or the texture of the products become further conspicuous. When this happens, the fresh flavor and/or texture will not be recovered even if the cereal processed food products are reheated before eating. Rather, due to the reheating, a deteriorated odor and dry/crumbly texture of the cereal processed food products become even more conspicuous.

Additionally, it is common to add edible oil and fat called rice cooking oil to raw rice when producing cooked rice for bento or rice balls sold at grocery stores, convenience stores, and the like. The edible oil and fat are added in order to improve the separation or releasability of cooked rice from the rice cooker, to improve the compatibility or suitability of the cooked rice with a rice ball forming machine and/or an arranging machine, and to improve the texture of the cooked rice. Similarly, when producing noodles, it is common to add edible oil and fat to boiled noodles in order to suppress the adhesion of noodles to cookware, to improve ease of mixing during stirring, and to improve the texture of the noodles. However, the cereal processed food products produced with the edible oil and fat have additional flavor (taste and smell) derived from the edible oil and fat, resulting in the decrease and deterioration of the flavor such as smell, sweetness, and/or umami of the freshly made cereal processed food products. Further, the added edible oil and fat are oxidized as the time passes from the production or processing to eating, and the deteriorated odor of the oil caused by such oxidization will be added to the cereal processed food products. As a result, the cereal processed food products may have less flavor and may even give strong unpleasant odor. That is, there was a problem that the cereal processed food products produced with edible oil and fat do not give pleasant flavor.

In case of rice, there are several proposals to improve the flavor and/or the texture of the cooked rice. For example, JP 2015-050988 A teaches to add roasted rice bran extract, which contains maltol, to cooked rice so as to suppress unpleasant odor of the cooked rice for long term storage.

With this technique, it is possible to suppress the unpleasant odor of the cooked rice for long term storage. However, it is not possible to suppress lipid oxidation and starch aging of the rice during storage and delivery at room temperature or under a chilled state. The technique of JP 2015-050988 A thus has a problem in which it is not possible to suppress the decrease and deterioration of the flavor and/or the texture of freshly cooked rice for a long period of time. Additionally, the technique of JP 2015-050988 A does not provide a solution to the unpleasant flavor of cooked rice produced with rice cooking oil, as well as a solution to the deteriorated odor derived from the rice cooking oil. Further, with the technique of JP 2015-050988 A, the flavor and/or the texture of freshly cooked rice cannot be obtained even if the rice is reheated before eating. Rather, the decreased and deteriorated flavor and/or texture disadvantageously stand out due to the reheating. Furthermore, since the technique of JP 2015-050988 A requires adjusting the roasted rice bran extract, the production steps become more complex.

Another conventional technique teaches to deliver cooked rice in frozen state and defrost it to eat at home. However, the flavor and the texture of rice is unavoidably decreased and deteriorated due to the freezing process. Further, it inconveniently takes a long time to defrost the frozen rice at room temperature. Although it is possible to shorten the defrosting time with a microwave, it may cause uneven heating thereby deteriorating the flavor and/or the texture of the rice significantly.

SUMMARY

An object of this disclosure is to provide a technique capable of suppressing decrease and deterioration of flavor and/or texture of a cereal processed food product over time after production as well as maintaining the flavor and/or the texture of the cereal processed food product. This disclosure further provides a technique capable of maintaining the flavor and/or the texture of a freshly made cereal processed food product even if the products are stored at room temperature or under a chilled state for a long period of time. Another object of this disclosure is to provide a technique capable of obtaining flavor and/or texture of a freshly made cereal processed food product even if the cereal processed food product is reheated before eating. Another object of this disclosure is to provide a technique capable of suppressing the unpleasant flavor of edible oil and fat and of suppressing oxidization and deteriorated odor of the edible oil and fat when the cereal processed food product is produced with the edible oil and fat. The technique is further capable of maintaining the flavor and/or the texture of the freshly made cereal processed food product for a long period of time.

Through intensive studies conducted in view of the above-mentioned problems, the inventors of this disclosure have found that, by adding a seasoning liquid that contains maltol and at least one aroma component selected from 5-Hydroxymethylfurfural, dimethyl sulfide, and 3-methylbutanal into an unprocessed cereal product or a cereal processed food product in a predetermined amount, it is possible to suppress the decrease and the deterioration of flavor and/or texture of a cereal processed food product over time after the production so as to obtain a cereal processed food product that has the long-lasted effect on fresh flavor (e.g., sweetness and smell) and the pleasant texture (e.g., feeling on the tongue and teeth), as well as it is possible to suppress the unpleasant deteriorated oil odor caused by the addition of edible oil and fat. Further, the inventors have found that the flavor and/or the texture of the freshly made cereal processed food product is recovered or maintained when the product is reheated since the lipid oxidation and the texture deterioration of the cereal processed food product is suppressed by the above seasoning liquid even during storage and delivery at room temperature or under a chilled state. This disclosure is made in view of the above knowledge.

To be specific, a first aspect of this disclosure relates to an improver for cereal processed food product that contains maltol as a component (A) and at least one component selected from 5-Hydroxymethylfurfural, dimethyl sulfide, and 3-methylbutanal as a component (B). A mass ratio of the component (B) with respect to the component (A) is 0.01 to 500 when the component (B) consists of 5-Hydroxymethylfurfural, the mass ratio of the component (B) with respect to the component (A) is 0.00001 to 1.0 when the component (B) consists of dimethyl sulfide, and the mass ratio of the component (B) with respect to the component (A) is 0.00001 to 1.0 when the component (B) consists of 3-methylbutanal. Further, a second aspect of this disclosure relates to a cereal processed food product that contains the above improver in a ratio of 0.1 to 50% by mass with respect to an unprocessed cereal product. Further, a third aspect of this disclosure relates to a method of producing a cereal processed food product that includes a step of adding the improver to an unprocessed cereal product or to a cereal processed food product so as to maintain a fresh flavor and/or texture. Further, a fourth aspect of this disclosure relates to a method of producing a seasoning liquid for cereal processed food product. This method includes a step of mixing maltol as a component (A), at least one component selected from 5-Hydroxymethylfurfural, dimethyl sulfide, and 3-methylbutanal as a component (B), a seasoning raw material, and an ingredient to be added as needed, such that a mass ratio of the component (B) with respect to the component (A) is 0.01 to 500 when the component (B) consists of 5-Hydroxymethylfurfural, the mass ratio of the component (B) with respect to the component (A) is 0.00001 to 1.0 when the component (B) consists of dimethyl sulfide, and the mass ratio of the component (B) with respect to the component (A) is 0.00001 to 1.0 when the component (B) consists of 3-methylbutanal; a step of making the mixed result a uniform liquid; and a step of filling the uniform liquid into a container. Further, a fifth aspect of this disclosure relates to a method of maintaining a fresh flavor and/or texture of a cereal processed food product for long term storage. This method includes a step of adding the improver to an unprocessed cereal product or to a cereal processed food product such that a content of maltol with respect to the unprocessed cereal product is 0.001 ppm to 20 ppm. Further, a sixth aspect of this disclosure relates to a method of suppressing a deteriorated odor of a cereal processed food product produced with an edible oil and fat. This method includes a step of adding the improver to an unprocessed cereal product or to a cereal processed food product such that a content of maltol with respect to the unprocessed cereal product is 0.001 ppm to 20 ppm.

Hereinafter, embodiments of this disclosure will be described in detail. It should be understood that this disclosure is not limited to the following embodiments (first embodiment to sixth embodiment) and can be implemented in any variant so long as such a variant does not deviate from the gist of this disclosure.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

First Embodiment: Improver for Cereal Processed Food Product

A first embodiment introduces an improver for cereal processed food product that contains maltol (component (A)) and at least one component (component (B)) selected from 5-Hydroxymethylfurfural, dimethyl sulfide, and 3-methylbutanal.

In the first embodiment, the "improver for cereal processed food product" is an agent added to an unprocessed cereal product or to a cereal processed food product in order to emphasize the deliciousness (flavor and texture) of the cereal processed food product. The improver is a fluid improver used when cooking a cereal processed food product and includes such as a cooked rice improver that is added to raw rice or to cooked rice to emphasize the deliciousness (flavor and texture) of the cooked rice and a noodle improver that is added to dried noodles or boiled noodles to emphasize the deliciousness (flavor and texture) of the noodle. The term "improver for cereal processed food product" in the first embodiment may contain, in addition to the component (A) and the component (B), seasoning raw material(s) and ingredient(s) described later. Considering the convenience of adding a cereal processed food product and afterwards, the "improver for cereal processed food product" in the first embodiment is generally a seasoning liquid that has liquidity. However, the state of the improver is not limited to liquid. The term "cooked rice" herein means processed rice products cooked by boiling or steaming rice after adding water thereto. For example, the "cooked rice" herein includes such as plain cooked rice, salted rice, red rice (steamed glutinous rice with red beans), okowa (steamed glutinous rice), takikomi-gohan (rice cooked together with ingredients and seasoning), maze-gohan (cooked rice mixed with seasoned ingredients), rice ball, sushi rice, rice cake, and rice dumpling. The term "rice" herein includes such as non-glutinous rice, glutinous rice, wash-free rice with different degrees of milling, and brown rice. The term "noodles" herein means foods made mainly from cereal flour such as wheat flour, rice flour, buckwheat flour, and beans; and is cooked by boiling or steaming the foods that have been shaped and processed into rods, plates, ribbons, etc. For example, the noodles include such as soba, udon, kishimen (flat wheat noodles), ramen, Chinese noodles, pasta, macaroni, somen (thin wheat noodles), pho (Vietnamese soup noodles), Korean cold noodles, and vermicelli.

Component (A): The improver for cereal processed food product of the first embodiment contains "maltol" as the component (A). The "maltol" herein represents 3-Hydroxy-2-methyl-4H-pyran-4-one under the IUPAC name and is an aroma component with a sweet scent that is naturally contained in pine needles, etc. and produced when saccharides are thermally decomposed. The form of the maltol is not particularly limited. For example, the maltol may be derived from a raw material used in food and drink; may be produced by heating a raw material containing saccharides such as sucrose, glucose, or high fructose corn syrup; or may be a starch decomposition product, a fragrance component, or a single preparation that is produced by enzymatically decomposing or hydrolyzing cereals. That is, any forms suitable to food and drink can be used as the maltol.

Component (B): The improver for cereal processed food product of the first embodiment contains, as the component (B), at least one component selected from 5-Hydroxymethylfurfural, dimethyl sulfide, and 3-methylbutanal. In the improver for cereal processed food product of the first embodiment, "5-Hydroxymethylfurfural" is an aroma component with a fragrant scent that is produced in trace amounts by heating milk, fruit juice, spirits, or foods such as honey. In the improver for cereal processed food product of the first embodiment, "dimethyl sulfide" is a fragrance component of seaweed and is generally known as an aroma component having a foul odor. In the improver for cereal processed food product of the first embodiment, "3-methylbutanal" is a component contained in such as liquors or fruits with another name for isovaleric aldehyde and is generally known as an aroma component with an unpleasant odor. It should be understood that the form of these components is not limited. For example, the components may be derived from a raw material used in food and drink or may be a fragrance component or a single preparation. That is, any forms suitable to food and drink can be used as the component (B).

Ratios of Component (B) to Component (A): In the improver for cereal processed food product of the first embodiment, the component (B), which consists of at least one component selected from 5-Hydroxymethylfurfural, dimethyl sulfide, and 3-methylbutanal, is contained in a predetermined mass ratio range with respect to the component (A), which consists of the maltol.

In the improver for cereal processed food product of the first embodiment, the ratio of the component (B) consisting of 5-Hydroxymethylfurfural with respect to the component (A) consisting of the maltol is not limited. However, the mass ratio thereof is generally 0.01 or more, more preferably 0.05 or more, further preferably 0.1 or more. Further, the mass ratio thereof is generally 500 or less, preferably 250 or less, further preferably 100 or less. Therefore, the ratio of the component (B) consisting of 5-Hydroxymethylfurfural with respect to the component (A) consisting of the maltol is generally 0.01 or more and 500 or less, preferably 0.05 or more and 250 or less, further preferably 0.1 or more and 100 or less.

In the improver for cereal processed food product of the first embodiment, the ratio of the component (B) consisting of dimethyl sulfide with respect to the component (A) consisting of the maltol is not limited. However, the mass ratio thereof is generally 0.00001 or more, preferably 0.00005 or more, further preferably 0.0001 or more. Further, the mass ratio thereof is generally 1.0 or less, preferably 0.5 or less, further preferably 0.1 or less. Therefore, the ratio of the component (B) consisting of dimethyl sulfide with respect to the component (A) consisting of the maltol is generally 0.00001 or more and 1.0 or less, preferably 0.00005 or more and 0.5 or less, further preferably 0.0001 or more and 0.1 or less.

In the improver for cereal processed food product of the first embodiment, the ratio of the component (B) consisting of 3-methylbutanal with respect to the component (A) consisting of the maltol is not limited. However, the mass ratio thereof is generally 0.00001 or more, preferably 0.00005 or more, further preferably 0.0001 or more. Further, the mass ratio thereof is generally 1.0 or less, preferably 0.5 or less, further preferably 0.1 or less. Therefore, the ratio of the component (B) consisting of 3-methylbutanal with respect to the component (A) consisting of the maltol is generally 0.00001 or more and 1.0 or less, preferably 0.00005 or more and 0.5 or less, further preferably 0.0001 or more and 0.1 or less.

In the improver for cereal processed food product of the first embodiment, the ratio of the total amount of the component (B) with respect to the component (A) consisting of the maltol is not limited. However, the mass ratio thereof is generally 0.01 or more, preferably 0.05 or more, further preferably 0.1 or more. Further, the mass ratio thereof is generally 500 or less, preferably 250 or less, more preferably 100 or less. It should be understood that the mass ratio of each component with respect to the maltol is preferably adjusted in the above predetermined range. Therefore, the ratio of the total amount of the component (B) with respect to the component (A) consisting of the maltol is generally 0.01 or more and 500 or less, preferably 0.05 or more and 250 or less, further preferably 0.1 or more and 100 or less.

When the mass ratios described in "Ratios of Component (B) to Component (A)" are out of these ranges, the flavor and/or the texture of the cereal processed food product may disadvantageously be deteriorated (i.e., flavor may not last) as the time passes from the production and processing of the cereal processed food products with the improver. Further, the flavor and/or the texture of the freshly made cereal processed food product may not be recovered or maintained by reheating since, in this case, the lipid oxidation and the texture deterioration of the cereal processed food product are not sufficiently suppressed during storage and delivery at room temperature or under a chilled state.

When the improver for cereal processed food product of the first embodiment contains maltol as the component (A) and all of 5-Hydroxymethylfurfural, dimethyl sulfide, and 3-methylbutanal as the component (B), it is possible to give better flavor and/or texture to the cereal processed food product than the improver having only one of 5-Hydroxymethylfurfural, dimethyl sulfide, and 3-methylbutanal as the component (B). Additionally, it is possible to suppress the deteriorated odor of oil when the cereal processed food product is cooked with edible oil and fat or when the cereal processed food product contains oil. Further, it is possible to have the flavor and/or the texture of a freshly made cereal processed food product significantly even after a long period of time has passed from the production or processing thereof.

Content of Component (A) in Improver for Cereal Processed Food Product of First Embodiment: The content of the maltol contained in the improver for cereal processed food product of the first embodiment as the component (A) is not limited. However, the content of the maltol is generally 0.05 ppm or more, preferably 0.1 ppm or more, further preferably 0.5 ppm or more. In addition, the content of the maltol is generally 500 ppm or less, preferably 100 ppm or less, further preferably 50 ppm or less. Therefore, the content of the maltol contained in the improver for cereal processed food product of the first embodiment as the component (A) is generally 0.05 ppm or more and 500 ppm or less, preferably 0.1 ppm or more and 100 ppm or less, further preferably 0.5 ppm or more and 50 ppm or less. When the content of the maltol is less than the above range, the flavor and/or the texture of the cereal processed food product may not be maintained sufficiently after a several hours has passed from the production of the cereal processed food product with the improver of the first embodiment. When the content of the maltol exceeds the above range, the aroma of maltol may be so strong that the flavor of the cereal processed food product may be impaired. Note that the term "ppm" herein means mass parts per million.

Content of Component (B) in Improver for Cereal Processed Food Product of First Embodiment: The content of each component of 5-Hydroxymethylfurfural, dimethyl sulfide, and 3-methylbutanal which represents the component (B) is not particularly limited.

However, when 5-Hydroxymethylfurfural is used as the component (B), the content thereof in the improver for cereal processed food product of the first embodiment is generally 0.2 ppm or more, preferably 1.0 ppm or more, further preferably 2.0 ppm or more. In addition, the content of 5-Hydroxymethylfurfural as the component (B) is generally 10000 ppm or less, preferably 5000 ppm or less, further preferably 2000 ppm or less. Therefore, the content of 5-Hydroxymethylfurfural as the component (B) in the improver for cereal processed food product of the first embodiment is generally 0.02 ppm or more and 10000 ppm or less, preferably 1.0 ppm or more and 5000 ppm or less, further preferably 2.0 ppm or more and 2000 ppm or less.

When dimethyl sulfide is used as the component (B), the content thereof in the improver for cereal processed food product of the first embodiment is generally 0.0002 ppm or more, preferably 0.001 ppm or more, further preferably 0.002 ppm or more. In addition, the content of dimethyl sulfide as the component (B) is generally 20 ppm or less, preferably 10 ppm or less, further preferably 2.0 ppm or less. Therefore, the content of dimethyl sulfide as the component (B) in the improver for cereal processed food product of the first embodiment is generally 0.0002 ppm or more and 20 ppm or less, preferably 0.001 ppm or more and 10 ppm or less, further preferably 0.002 ppm or more and 2.0 ppm or less.

When 3-methylbutanal is used as the component (B), the content thereof in the improver for cereal processed food product of the first embodiment is generally 0.0002 ppm or more, preferably 0.001 ppm or more, further preferably 0.002 ppm or more. In addition, the content of 3-methylbutanal as the component (B) is generally 20 ppm or less, preferably 10 ppm or less, further preferably 2 ppm or less. Therefore, the content of 3-methylbutanal as the component (B) in the improver for cereal processed food product of the first embodiment is generally 0.0002 ppm or more and 20 ppm or less, preferably 0.001 ppm or more and 10 ppm or less, further preferably 0.002 ppm or more and 2 ppm or less.

When "the content of the component (B) in the improver for cereal processed food product of the first embodiment" is less than the above range, the flavor and/or the texture of the cooked rice may not be maintained sufficiently after a several hours has passed from the production of the cooked rice with the improver of the first embodiment. When the content of the component (B) exceeds the above range, the aroma balance with the maltol may be lost and thus the flavor of the cooked rice may be impaired.

In the improver for cereal processed food product of the first embodiment, it is possible to calculate the content of each of the components (A) and (B) based on the amount of the fragrance preparation added to the improver. Alternatively, it is also possible to measure the content using a common method of measuring aroma components. For example, similar to the quantification method of various aroma components in examples described later, it is possible to measure the contents with gas chromatography-mass spectrometry (GV-MS) or the like.

Other Raw Materials in Improver for Cereal Processed Food Product of First Embodiment: The improver for cereal processed food product of the first embodiment may additionally contain an ingredient and/or a raw material that may be used in an ordinal seasoning liquid insofar as the effect is not impaired. Such a raw material varies depending on the form of the seasoning liquid, but as follows. Here, the improver of the first embodiment to which a raw material for seasoning (seasoning raw material) and/or an ingredient has been added may be referred to as a "seasoning liquid for cereal processed food product." In general, water, saccharides (including high-sweetness sweeteners), and salts are examples of basic raw materials. In addition to these basic raw materials for a seasoning liquid, the improver for cereal processed food product of the first embodiment may contain, as a raw material for seasoning (seasoning raw material), an additive such as a taste/flavor component (e.g., fat and oil or cooking oil, vinegar, juice, condiment, condiment extract, flavor oil, amino acid seasoning, nucleic acid seasoning, organic acid seasoning, flavor raw material, umami seasoning, alcohol, flavor); a viscosity modifier other than a gum and a cold water-swelling starch; a stabilizer; a colorant; and a calcium salt. Furthermore, the improver for cereal processed food product of the first embodiment may additionally contain an ingredient such as a vegetable (e.g., carrot, burdock root, daikon radish), a cereal variety (e.g., red bean, soybean), a meat, and fish. The contents of the above seasoning raw materials and ingredients are not particularly limited and can be decided depending on the application of the improver for cereal processed food product of the first embodiment.

Examples of the oil and fat include soybean oil, soybean germ oil, rapeseed oil, corn oil, sesame oil, *perilla* oil, flaxseed oil, peanut oil, safflower oil, high oleic safflower oil, sunflower oil, cottonseed oil, grape seed oil, macadamia nut oil, hazelnut oil, pumpkin seed oil, walnut oil, *camellia* oil, tea seed oil, *perilla* oil, olive oil, rice bran oil, wheat germ oil, palm oil, and algae oil. It should be understood that it is possible to use only one of the above oils and fats or to use two or more oils and fats with any combinations at any ratios.

Examples of the vinegar include brewed vinegar made from cereals such as rice and wheat and/or juice; and synthetic vinegar which is made by adding seasoning (e.g., sugars) to diluted glacial acetic acid or acetic acid or by further adding brewed vinegar thereto. Examples of the brewed vinegar include rice vinegar, cereal vinegar (e.g., brown rice vinegar, black vinegar, lees vinegar, malt vinegar, adlay vinegar, soybean vinegar), fruit vinegar (e.g., apple cider vinegar, grape vinegar, lemon vinegar, cabos vinegar, plum vinegar, wine vinegar, balsamic vinegar), alcohol vinegar produced by acetic acid fermentation of ethanol, Chinese vinegar, and sherry vinegar. An example of the synthetic vinegar includes glacial acetic acid or acetic acid diluted appropriately with water. It should be understood that it is possible to use only one of the above vinegars or to use two or more vinegars combined together. In the improver for cereal processed food product of the first embodiment, the vinegar is preferable to be brewed vinegar or synthetic vinegar that has a high acetic acid content, weak flavor derived from its raw material, and a high acetic concentration.

Examples of the saccharide include sugars, maltose, fructose, isomerized liquid sugar, glucose, syrup, and sugar alcohol such as dextrin, sorbitol, maltitol, and xylitol. It should be understood that it is possible to use only one of the above saccharides or to use two or more saccharides with any combination at any ratios.

Examples of the high-sweetness sweetener include aspartame, acesulfame potassium, sucralose, neotame, licorice extract, *stevia*, and their enzyme-treated products. It should be understood that it is possible to use only one of the above high-sweetness sweeteners or to use two or more high-sweetness sweetener with any combination at any ratios.

The salt may be salt itself or a salt containing food product. Such a salt containing food product is not specifically particularly limited and includes, for example, soy source, miso (fermented soybean paste), and dashi (soup stock). The soy source is not particularly limited and includes, for example, dark soy source, light soy source, white soy source, tamari soy source (aged soy source), and reprepared soy source. It should be understood that it is possible to use only one of the above soy sources or to use two or more soy sources with any combination at any ratios. The miso is not particularly limited and includes, for example, wheat miso, rice miso, soybean miso, and mixed miso, as well as red miso, white miso, and light-colored miso, which are named according to the colors derived from their production methods. It should be understood that it is possible to use only one of the above miso or to use two or more miso with any combination at any ratios.

The condiments have a distinctive aroma, stimulating taste, and color. The condiments are a part of plant (e.g., plant fruit, peel, flower, bud, bark, stem, leave, seed, root, and underground stem) and is contained in a drink or food product in order to add scent to, to deodorize, to season, and/or to color the food product. The condiments include spices and herbs. Spices do not include stems, leaves, and flowers of the condiments. Examples of spices include peppers (black peppers, white peppers, and red peppers), garlics, gingers, sesames (sesame seeds), chili peppers, horseradish (western wasabi), mustards, poppy seeds, yuzu (small citrus fruit), nutmegs, cinnamons, paprikas, cardamoms, cumin, saffron, allpices, cloves, Japanese peppers, orange peels, fennels, licorices, fenugreeks, dill seeds, Sichuan peppers, long peppers, and olives. The herbs are made from stems, leaves, and flowers of the condiments. Examples of herbs include watercress, corianders, *perilla*, celery, tarragon, chives, chervil, sage, thyme, laurel, garlic chives, parsley, mustard greens, Japanese gingers, mugwort, basil, oregano, rosemary, peppermints, savory, lemongrass, dill, wasabi leaves, and Japanese pepper leaves.

In general, any food extracts which are indicated as condiments or spices can be the condiment extracts. Examples of the condiment extracts include chili extracts, mustard extracts, ginger extracts, wasabi extracts, pepper extracts, garlic extracts, onion extracts, and Japanese pepper extracts. It should be understood that it is possible to use only one of the above condiment extracts or to use two or more condiment extracts with any combination at any ratios.

Examples of the flavor oil include ginger oil, garlic oil, mustard oil, onion oil, sesame oil, green onion oil, garlic chives oil, water dropwort oil, *perilla* oil, wasabi oil, lemon oil, seafood oil, and meat oil. It should be understood that it is possible to use only one of the above flavor oils or to use two or more flavor oils with any combination at any ratios.

Examples of the amino acid seasonings include sodium L-glutamate, DL-alanine, glycine, L-tryptophan, DL-tryptophan, L-phenylalanine, L-methionine, DL-methionine, L-lysine, L-aspartic acid, sodium L-aspartate, and L-arginine. It should be understood that it is possible to use only one of the above amino acid seasonings or to use two or more amino acid seasonings with any combination at any ratios.

Examples of the nucleic acid seasonings include 5'-disodium inosinate, 5'-disodium guanylate, 5'-disodium uridylate, 5'-Disodium cytidilate, 5'-ribonucleotide calcium, and 5'-ribonucleotide disodium. It should be understood that it is possible to use only one of the above nucleic acid seasonings or to use two or more nucleic acid seasonings with any combination at any ratios.

Examples of the organic acid seasonings include calcium citrate, trisodium citrate, potassium gluconate, sodium gluconate, succinic acid, monosodium succinate, disodium succinate, sodium acetate, DL-potassium hydrogen tartrate, L-potassium hydrogen tartrate, DL-sodium tartrate, L-sodium tartrate, potassium lactate, calcium lactate, sodium lactate, monosodium fumarate, and DL-sodium malate. It should be understood that it is possible to use only one of the above organic acid seasonings or to use two or more organic acid seasonings with any combination at any ratios. By using two ore more organic acid seasonings together, the taste of seasonings is synergistically enhanced.

Examples of the flavor raw materials include bonito dashi, kelp dashi, vegetable extract, bonito extract, kelp extract, seafood extract, and meat extract. It should be understood that it is possible to use only one of the above flavor raw materials or to use two or more flavor raw materials with any combination at any ratios.

Examples of the umami seasonings include protein hydrolysate and yeast extract. It should be understood that it is possible to use only one of the above umami seasonings or to use two or more umami seasonings with any combination at any ratios.

Examples of the alcohols include sake, synthetic sake, mirin (rice wine with low alcohol and high sugar content), shochu (Japanese distilled alcohol), wine, liqueur, and Shaoxing wine. It should be understood that it is possible to use only one of the above alcohols or to use two or more alcohols with any combination at any ratios.

Examples of the flavors include ginger flavors, garlic flavors, mustard flavors, onion flavors, sesame flavors, green onion flavors, garlic chive flavors, *perilla* flavors, wasabi flavors, and lemon flavors. It should be understood that it is possible to use only one of the above flavors or to use two or more flavors with any combination at any ratios.

Examples of the viscosity modifiers include alginic acid, sodium alginate, carrageenan, karaya gum, agar, cellulose, tamarind seed gum, pullulan, pectin, chitin, and chitosan. It should be understood that it is possible to use only one of the above viscosity modifiers or to use two or more viscosity modifiers with any combination at any ratios.

Second Embodiment: Cereal Processed Food Products

A second embodiment represents a cereal processed food product obtained by adding the improver for cereal processed food product of the first embodiment to an unprocessed cereal product or to a cereal processed food product. Such a cereal processed food product contains maltol and at least one aroma component selected from 5-Hydroxymethylfurfural, dimethyl sulfide, and 3-methylbutanal.

Adding Amount of Improver for Cereal Processed Food Product in Cereal Processed Food Product of Second Embodiment: An improver for cereal processed food product added to the cereal processed food product of the second embodiment is added to either an unprocessed cereal product or a cereal processed food product. The adding amount of the improver should be adjusted such that the content of the maltol with respect to the cereal is within a predetermined range, as described later. For example, when the improver is added to a cooked rice (or processed rice), the adding amount is determined based on the content of the maltol in the improver for cereal processed food product of the first embodiment, wherein the content of the maltol is calculated or determined from the mass of raw rice to be cooked.

The adding amount of the improver of the first embodiment with respect to the cereal processed food product of the second embodiment is not limited. However, the content of the maltol with respect to the cereal is generally 0.001 ppm or more, preferably 0.01 ppm or more. In addition, the content of the maltol is generally 20 ppm or less, preferably 5 ppm or less. Therefore, the adding amount of the improver of the first embodiment to the cereal processed food product of the second embodiment is determined such that the content of the maltol with respect to the cereal is generally 0.001 ppm or more and 20 ppm or less, preferably 0.01 ppm or more and 5 ppm or less.

When the content of the maltol is less than the above range, the flavor and/or the texture of the cereal processed food product may not be maintained sufficiently after a several hours has passed from the production and the processing of the cereal processed food product of the second embodiment with the improver of the first embodiment. When the content of the maltol exceeds the above range, the flavor of the maltol as the component (A) and the flavor of the aroma components of the component (B) are added to the cereal processed food product. As a result, the aroma balance of the cereal processed food product may be lost, and thus the flavor and/or the texture of the freshly made cereal processed food product may be impaired.

As described above, the adding amount of the improver of the first embodiment added to the cereal processed food product of the second embodiment may be adjusted such that the content of the maltol with respect to the cereal is within a predetermined range. However, from the viewpoint of ease of handling during the production, the improver of the first embodiment is added such that the ratio of the adding amount with respect to the cereal is generally 0.1 wt. % or more, preferably 0.5 wt. % or more, further preferably 1.0 wt. % or more. In addition, the improver is added such that the ratio of the adding amount is generally 50 wt. % or less, preferably 20 wt. % or less, further preferably 10 wt. % or less. Therefore, the improver of the first embodiment is added to the cereal processed food product of the second embodiment such that the ratio of the adding amount with respect to the cereal is generally 0.1 wt. % or more and 50 wt. % or less, preferably 0.5 wt. % or more and 20 wt. % or less, further preferably 1.0 wt. % or more and 10 wt. % or less.

It should be noted that the cereal processed food product of the second embodiment includes a cereal processed food product produced by a method of producing a cereal processed food product of a third embodiment.

According to the cereal processed food product of the second embodiment, which includes a cereal processed food product produced by the method of producing a cereal processed food product of the third embodiment, a technique capable of suppressing the decrease and the deterioration of the flavor and/or the texture of the cereal processed food product over time after production is provided. The cereal processed food product of the second embodiment further provides a technique capable of maintaining the flavor and/or the texture of the cereal processed food product, thereby the flavor and/or the texture of the freshly made cereal processed food product is maintained even if the product is stored at room temperature or under a chilled state for a long period of time. Additionally, according to the cereal processed food product of the second embodiment, which includes a cereal processed food product produced by the method of producing a cereal processed food product of the third embodiment, a technique capable of giving the flavor and/or the texture of the freshly made cereal processed food product even if the cereal processed food product is reheated before eating is provided.

Third Embodiment: Method of Producing Cereal Processed Food Product Capable of Maintain Fresh Flavor and/or Texture A third embodiment relates to a method of producing a cereal processed food product that maintains its fresh flavor. The method of the third embodiment is characterized to include a step of adding the improver of the first embodiment to an unprocessed cereal product or to a cereal processed food product.

The improver for cereal processed food product of the first embodiment is as described above. It should be noted that, in the third embodiment, it is preferable to add and/or mix the improver such that the adding amount of the improver to the cereal processed food product as well as the other conditions should comply with the preferred ranges described above.

In the first to sixth embodiments, the term cereal is a general term for annual or biennial herbaceous crops cultivated to harvest grains and their grains and represents a cereal in a narrow sense such as a Gramineae cereal (e.g., rice, wheat, barley, corn, millet, and Japanese barnyard millet), a Fabaceae cereal (e.g., soybean, red bean), and a Polygonaceae cereal (e.g., soba). Additionally, the cereal in the first to sixth embodiments includes a cereal obtained by semi-processing the cereal in the narrow sense to the state just before human can eat. That is, the cereal also includes, for example, raw rice made by threshing rice plant (*Oryza sativa*), and dried or raw noodles (e.g., pasta, udon, soba) made by processing and shaping cereals such as rice plant (*Oryza sativa*), barley, wheat, beans, and corns into rods, plates, ribbons, or so. The term "cereal" herein includes cereals that are not edible to humans or is not normally eaten by humans as they are.

In the first to sixth embodiments, the term cereal processed food products refers to foods that are made from the above cereals and processed so as to be edible to humans. That is, the cereal processed food products in the first to sixth embodiments refer to foods that are made by processing the above cereals and thus refer to the foods made by processing the cereals such as rice, barley, wheat, beans, and corns; or cereals including dried noodles and raw noodles (past, udon, soba) so as to be edible to humans. To be specific, cooked rice and noodles described in the first embodiment are examples of the cereal processed food products. The term "cooked rice" herein means processed rice products cooked by boiling or steaming rice after adding water thereto. For example, the "cooked rice" herein includes such as plain cooked rice, salted rice, red rice (steamed glutinous rice with red beans), okowa (steamed glutinous rice), takikomi-gohan (rice cooked together with ingredients and seasoning), kamameshi (rice boiled with various ingredients in a small pot), maze-gohan (cooked rice mixed with seasoned ingredients), rice ball, sushi rice, rice cake, and rice dumpling. It should be understood that the raw materials and/or ingredients included in the processed rice products are not particularly limited and are preferably added or mixed to the rice before or after cooking as needed. The term "noodles" herein means foods made mainly from cereal flour such as wheat flour, rice flour, buckwheat flour, and beans; and is cooked by boiling or steaming dried or raw noodles that have been shaped and processed into rods, plates, ribbons, etc. For example, the noodles include such as soba, udon, kishimen (flat wheat noodles), ramen, Chinese noodles, pasta, macaroni, somen (thin wheat noodles), pho (Vietnamese soup noodles), Korean cold noodles, and vermicelli. It should be understood that the raw materials and/or ingredients included in the noodles are not particularly limited and are preferably added or mixed to the noodles during or after boiling as needed.

In the third embodiment, the improver for cereal processed food product of the first embodiment is added to an unprocessed cereal product or to a cereal processed food product. At this time, it is possible to further add edible oil and fat together with the improver. In the third embodiment, it should be understood that the adding amount of the edible oil and fat added to an unprocessed cereal product or the adding amount of the edible oil and fat added to a cereal processed food product is not particularly limited.

In case of cooked rice, the content of the edible oil and fat with respect to the raw rice is adjusted to be within a predetermined range. To be specific, from the viewpoint of improving the releasability and machine suitability of the cooked rice, the content of the edible oil and fat with respect to the raw rice is generally 0.05 wt. % or more, preferably 0.1 wt. % or more, further preferably 0.2 wt. % or more. In addition, from the viewpoint of obtaining glutinous texture of cooked rice, the content is generally 5.0 wt. % or less, preferably 4.0 wt. % or less, further preferably 2.0 wt. % or less. That is, when the edible oil and fat is added to raw rice, it is preferable to add and mix 0.05 wt. % to 5.0 wt. % of the edible oil and fat to the raw rice before cooking.

In case of noodles, the content of the edible oil and fat with respect to the boiled noodles is adjusted to be within a predetermined range. To be specific, from the viewpoint of improving the releasability and machine suitability of the noodles, the content of the edible oil and fat with respect to the boiled noodles is generally 0.05 wt. % or more, preferably 0.1 wt. % or more, further preferably 0.2 wt. % or more. In addition, from the viewpoint of obtaining glutinous texture of boiled noodles, the content is generally 5.0 wt. % or less, preferably 4.0 wt. % or less, further preferably 2.0 wt. % or less. That is, when the edible oil and fat is added to raw noodles, it is preferable to add and mix 0.05 wt. % to 5.0 wt. % of the edible oil and fat to the raw noodles before boiling.

Fourth Embodiment: Method of Producing Seasoning Liquid for Cereal Processed Food Product A fourth embodiment relates to a method of producing a seasoning liquid for cereal processed food product. The method of the fourth embodiment is characterized to include steps of mixing the following component (A), the following component (B), a seasoning raw material, and an ingredient to be added as needed; making them a uniform liquid; and filling the uniform liquid into a container. The component (A) herein is maltol, and the component (B) herein is at least one component selected from 5-Hydroxymethylfurfural, dimethyl sulfide, and 3-methylbutanal.

It should be noted that the component (A), the component (B), the seasoning raw material, and the ingredient to be added as needed are as described in the first to the third embodiments. The content ratio of the component (B) with respect to the component (A) is also as described in the first embodiment.

In the fourth embodiment, mixing may include stirring or shaking and may be carried out while heating if necessary. Mixing and stirring of the raw materials is carried out in accordance with a known method, and the temperature in the mixing and stirring step is generally at 35° C. or more, preferably 40° C. or more. When the mixing is carried out while heating, the upper limit temperature is generally at 100° C. or less, preferably 90° C. or less, further preferably 85° C. or less in order to suppress the volatilization of the component (A) and/or the component (B).

After making the uniform liquid, the uniform liquid is filled into a container after or without sterilization treatment such as heat sterilization and membrane filtration sterilization, similar to a normal liquid seasoning. It should be understood that the material and/or the shape of the container used for the seasoning liquid of the third embodiment are not particularly limited. For example, the container may include a plastic container, a pouch (polyethylene pouch, aluminum pouch), a plastic bottle, a steel can, an aluminum can, and a bottle container. The seasoning liquid of the fourth embodiment is filled into the container and is sterilized by heat sterilization or retort sterilization to be the liquid seasoning.

It should be understood that the use of the seasoning liquid for cereal processed food product of the fourth embodiment is not particularly limited. For example, in case of cooked rice, the seasoning liquid may be added to raw rice or to cooked rice. The term "cooked rice" herein means processed rice products cooked by boiling or steaming rice after adding water thereto. For example, the "cooked rice" herein includes such as plain cooked rice, salted rice, red rice (steamed glutinous rice with red beans), okowa (steamed glutinous rice), takikomi-gohan (rice cooked together with ingredients and seasoning), kamameshi (rice boiled with various ingredients in a small pot), maze-gohan (cooked rice mixed with seasoned ingredients), rice ball, sushi rice, rice cake, and rice dumpling. It should be understood that the raw materials and/or ingredients included in the processed rice products are not particularly limited and, prior to adding the improver, they are preferably added or mixed to the rice before or after cooking as needed. In case of noodles, the seasoning liquid may be added to dried noodle before boiling or to the noodles after boiling. The term "noodles" herein means foods made mainly from cereal flour such as wheat flour, rice flour, buckwheat flour, and bean. The noodles are then processed into a linear shape and is cooked by boiling or steaming. For example, the noodles include such as soba, udon, kishimen (flat wheat noodles), ramen, Chinese noodles, pasta, macaroni, somen (thin wheat noodles), pho (Vietnamese soup noodles), Korean cold noodles, and vermicelli.

Fifth Embodiment: Method of Maintaining Fresh Flavor and/or Texture of Cereal Processed Food Product for Long Term Storage A fifth embodiment relates to a method of maintaining fresh flavor and/or texture of a cereal processed food product for long term storage. The method of the fifth embodiment is characterized to add the improver for cereal processed food product of the first embodiment to an unprocessed cereal product or to a cereal processed food product such that a content of maltol is 0.001 ppm to 20 ppm as a ratio to the cereal.

In the fifth embodiment, the improver for cereal processed food product, the cereal, and the cereal processed food product are as described in the first to fourth embodiments.

In the fifth embodiment, the improver of the first embodiment is added such that the content of the maltol is 0.001 ppm to 20 ppm as a ratio to the cereal.

With the method of the fifth embodiment, it is possible to maintain the fresh flavor and/or texture of the cereal processed food product for long term storage, as well as it is possible to recover the fresh flavor and/or texture when the cereal processed food product is reheated. The term "long term storage" herein refers to a state in which about 6 to 48 hours have passed after the production. Accordingly, for cooked rice or noodles stored at room temperature or under a chilled state, for cooked rice to which an edible oil and fat is added, and/or for noodles to which the edible oil and fat is added, it is possible to suppress lipid oxidation and texture deterioration of the food product, as well as possible to suppress unpleasant flavor and deteriorated odor of the oil, thereby maintaining the fresh flavor and/or texture of cooked rice or the fresh flavor and/or texture of noodles. It is also possible to give pleasant flavor and texture similar to those of freshly made cooked rice or noodles when reheated.

Sixth Embodiment: Method of Suppressing Deteriorated Odor of Cereal Processed Food Product Produced with Edible Oil and Fat A sixth embodiment relates to a method of suppressing deteriorated odor of a cereal processed food product produced with an edible oil and fat. The method of the sixth embodiment is characterized to include a step of adding the improver of the first embodiment to an unprocessed cereal product or to a cereal processed food product such that a content of maltol is 0.001 ppm to 20 ppm as a ratio to the cereal.

Here, the edible oil and fact, the cereal, and the cereal processed food product are as described in the first to fifth embodiments.

In the sixth embodiment, the improver of the first embodiment is added such that the content of the maltol is 0.001 ppm to 20 ppm as a ratio to the cereal.

With the sixth embodiment, the improver of the first embodiment is added to a cereal processed food product produced with the edible oil and fat at a predetermined ratio. As a result, it is possible to suppress the deteriorated odor. Accordingly, for the cereal processed food product produced with the edible oil and fat (i.e., for cooked rice produced with the edible oil and fat or for noodles produced with the edible oil and fat), it is possible to suppress lipid oxidation and texture deterioration of the food product, as well as possible to suppress unpleasant flavor and deteriorated odor of the oil even after long term storage at room temperature or under a chilled state, thereby maintaining the fresh flavor and/or texture of cooked rice or the fresh flavor and/or texture of noodles. It is also possible to give pleasant flavor and/or texture similar to those of freshly made cooked rice or noodles when reheated. As described in the fifth embodiment, the term "long term storage" herein refers to a state in which about 6 to 48 hours have passed after the production.

EXAMPLES

Hereinafter, the disclosure will be described in detail with reference to examples. It should be understood that these examples are merely examples for convenience of explanation, and the disclosure is not limited to these examples in any sense.

Example 1: Study of Amounts of Component (A) and of Component (B) in Improver for Cereal Processed Food Product (1) Preparations of Test Products: Maltol as the component (A) and 5-Hydroxymethylfurfural, dimethyl sulfide, and 3-methylbutanal (all manufactured by Tokyo Chemical Industry Co., Ltd.) as the component (B) were added to ion-exchanged water and were sufficiently stirred to prepare a 1000 ppm solution. The combinations and the compound ratios of the obtained solution were changed and diluted with water to prepare the improvers for cereal processed food products (Test Products No. 1 to 45) having predetermined concentrations shown in the following Table 1-1 to Table 3-4.

(2) Evaluation Procedure and Evaluation Results of Test Products: For the test products No. 1 to 45 prepared in accordance with the above item (1), sensory tests on the flavor balance were conducted. The sensory tests were conducted by a panel consisting of ten experts using the following three degrees of criteria. The panel members conducted the sensory tests were well familiar with the commercially available improvers that are usually on the market and were skilled enough to fully understand the general level ("normal" in evaluation) of a "flavor balance". The results of the sensory tests are shown in Table 1-1 to Table 3-4.

POOR Having a poor flavor balance and not favorable as an improver for cereal processed food product GOOD Having a good flavor balance and favorable as an improver for cereal processed food product EXCELLENT Having an excellent flavor balance and particularly favorable as an improver for cereal processed food product Example 2: Study of Amounts of Component (A) and of Component (B) in Cooked Rice (1) Preparations of Test Products: The test products having the flavor balance of "GOOD" or "EXCELLENT" as an improver for cereal processed food product in the sensory evaluations of Example 1 (i.e., test products No. 1 to 9, 11 to 14, 16 to 24, 26 to 29, 31 to 39, and 41 to 44) were added to raw rice after washing and soaking in water. Here, the adding amount of the improver for cereal processed food product with respect to the raw rice before washing and soaking in water was 1% by mass. The raw rice was then added with 1.25 pts. mass of water (normal additional amount of water) per 1 pt. mass of raw rice and cooked with a commercially available rice cooker in a normal way. Further, a cooked rice product to which neither the component (A) nor the component (B) was added was used as a control (Comparative Example 1).

(2) Evaluation Procedure of Test Products: For the test products prepared in accordance with the item (1) (i.e., test products No. 1 to 9, 11 to 14, 16 to 24, 26 to 29, 31 to 39, and 41 to 44), sensory tests on "fresh flavor immediately after cooking", "flavor 6 hours after cooking", "flavor 12 hours after cooking", "flavor 24 hours after cooking", and "flavor 48 hours after cooking" were conducted. Further, the test products were reheated in a microwave at 500 W for 1 minute after storing them at room temperature or at 4° C. for 6 hours, 12 hours, 24 hours, and 48 hours, and then the sensory tests on "scent 6 hours after cooking", "scent 12 hours after cooking", "scent 24 hours after cooking", and "scent 48 hours after cooking" were conducted. The sensory tests on the flavor and scent were conducted by a panel consisting of ten experts using the following five levels of criteria.

Level 1 Having no or little flavor/scent

Level 2 Having significantly weaker flavor/scent than cooked rice immediately after cooking Level 3 Having weaker flavor/scent than cooked rice immediately after cooking Level 4 Having slightly weaker flavor/scent than cooked rice immediately after cooking Level 5 Having similar flavor/scent to cooked rice immediately after cooking Additionally, the sensory tests on the texture of the test products were conducted in accordance with the following five levels of criteria. The panel members conducted the sensory tests were well familiar with the commercially available cooked rice that is usually on the market and were skilled enough to fully understand the general level ("normal" in evaluation) of each evaluation item.

Level 1 Very unfavorable due to overall dry/crumbly texture

Level 2 Unfavorable due to partially dry/crumbly texture

Level 3 No dry/crumbly texture but a little unfavorable since rice grains are dry Level 4 Favorable since rice grains are not dry and having glutinous texture Level 5 Very favorable due to moist and glutinous texture similar to cooked rice immediately after cooking (3) Evaluation Results of Test Products: The compositions of the test products (No. 1 to 9, 11 to 14, 16 to 24, 26 to 29, 31 to 39, and 41 to 44), the mass compounding ratios of the component (A) and the component (B), the adding amounts of the improver for cereal processed food product with respect to the raw rice, the contents of maltol with respect to the raw rice, and the results of the sensory tests are shown in Table 1-1 to Table 3-4. It should be noted that similar sensory evaluations were conducted to the cooked rice to which the improver was added after cooking, and the results thereof were similar to those of the above cooked rice to which the improver was added before cooking. The cooked rice to which the improver was added after cooking was obtained by adding 1.25 pts. mass of water (normal additional amount of water) per 1 pt. mass of raw rice after washing and soaking in water. In this case, the adding amount of the improver with respect to the raw rice before washing and soaking in water was 1% by mass.

Example 3: Study of Amounts of Component (A) and of Component (B) in Cooked Rice (1) Preparations of Test Products: Water was added to 20 kg of commercially available rice flour so as to be 50 L. A general α-amylase (weight ratio to rice flour was 0.1% by mass) was added thereto, and the mixture was heated at 80° C. for 20 minutes. After cooling to room temperature, the mixture was added with β-amylase (weight ratio to rice flour was 0.1% by mass) and protease (weight ratio to rice flour was 0.1% by mass) and processed overnight at 58° C. The processed results were then solid-liquid separated (filtered by filter paper) to prepare a starch decomposition product (hereinafter referred to as saccharification liquid). The test products of improvers No. 46 to 49 shown in Table 4-1 to Table 4-5 were prepared by adding the component (A) prepared in accordance with the item (1) of Example 1 and 10000 ppm of solution of the component (B) to the prepared saccharification liquid.

(2) Evaluation Procedure of Test Products; Contents and Mass Ratio of Component (A) and Component (B) in Seasoning Liquid: For the test products No. 46 to 49 prepared in accordance with the item (1), the quantitative values were calculated based on peak areas measured by gas chromatography-mass spectrometry (GC-MS), and the content mass ratio of the component (B) to the component (A) were determined based on the calculated values. The GC/MS measurement conditions are as follows.

Method and Conditions of Measuring Maltol and 5-Hydroxymethylfurfural

Extract Method of Aroma Component (Solvent Extraction):
  The sample and dichloromethane were mixed at a ratio of 1:1 and shaken. The mixture was then centrifuged, and the dichloromethane layer was used as analytical sample.

Analytical Method of Aroma Components:
  In accordance with the following conditions, a peak area of each aroma component was analyzed using gas chromatography and mass spectrometry.

[Gas Chromatography Conditions]
    Measuring Device: Agilent 7980B GC System (Agilent Technologies, Inc.)
    GC Column: DB-WAX UI (Agilent Technologies, Inc.)
    Length 30 m, Column Inner Diameter 0.25 mm, Film Thickness 0.25 μm
    Carrier: Helium (He) gas at 1.0 mL/min.
    Temperature Condition: Hold 40° C. (3 min.)→Heat up to 250° C. at 10° C./min.→Hold for 10 minutes and inject 1 μl of sample

[Mass Spectrometry Conditions]
    Measuring Device: Agilent 5977B MSD (Agilent Technologies, Inc.)
    Ionization Method: EI
    Measuring Mode: SIM Quantification Method of Aroma Component:
  Each aroma component with a known concentration was analyzed as a standard sample, and a calibration curve was created based on the detected peak area. The content of the component (B) was then calculated by applying the analysis results of the analytical sample to the calibration curve.

Method and Conditions of Measuring Dimethyl Sulfide and 3-Methylbutanal Separation and Concentration Method of Aroma Components In accordance with the following conditions, the aroma components were separated and concentrated. Here, 100 g of the sample was weighted into a 1 L vial. After sealing the vial, the sample was preheated at 30° C. for 30 min. Then, 200 ml of the gas phase in the vial was introduced into a concentrator as a sample.
Volatile Component Concentrator: Entech 7200 (Entech Instruments, Inc.)
Concentration Mode: Cold Trap Dehydration (CTD)
M1 (Empty) Temperature: Trap at −40° C.→Desorb at 0° C.
M2 (Tenax) Temperature: Trap at −50° C.→Desorb at 200° C.
M3 (Cyro Focus) Temperature: Trap at −160° C.→Desorb at 100° C.

Analytical Method of Aroma Components:
In accordance with the following conditions, a peak area of each aroma component was analyzed using gas chromatograph method and mass spectrometry.
[Gas Chromatograph Conditions]
Measuring Device: Agilent 7980B GC System (Agilent Technologies, Inc.)
GC Column: DB-1 (Agilent Technologies, Inc.)
Length 60 m, Column Inner Diameter 0.32 mm, Film Thickness 1.0 μm
Carrier: Helium (He) gas at 1.0 mL/min.
Temperature Condition: Hold 35° C. (5 min.)→Heat up to 220° C. at 10° C./min.→Hold for 5 minutes.
[Mass Spectrometry Conditions]
Measuring Device: Agilent 5977B MSD (Agilent Technologies, Inc.)
Ionization Method: EI
Measuring Mode: SIM Quantification Method of Aroma Component:
Each aroma component with a known concentration was analyzed as a standard sample, and a calibration curve was created based on the detected peak area. The content of the component (B) was then calculated by applying the analysis results of the analytical sample to the calibration curve.

Next, the test products No. 46 to 69 prepared in accordance with the item (1) and a rice cooking oil (J-Oil Mills, Inc.) were added to raw rice after washing and soaking in water. Here, the adding amount of each test products No. 46 to 69 with respect to the raw rice before washing and soaking in water was 1% by mass, and the adding amount of the rice cooking oil with respect thereto was 2% by mass. The raw rice was then added with 1.25 pts. mass of water (normal additional amount of water) per 1 pt. mass of the raw rice. After mixing the added water and the raw rice, the rice was cooked with a commercially available rice cooker in a normal way to produce the cooked rice products. Further, a cooked rice product to which neither the component (A) nor the component (B) was added was used as a control (Comparative Example 2).

Sensory Tests: For the cooked rice products as prepared above, the sensory tests on "fresh flavor immediately after cooking", "flavor 6 hours after cooking", "flavor 12 hours after cooking", "flavor 24 hours after cooking", "flavor 48 hours after cooking", "strength of rice cooking oil odor immediately after cooking", and "strength of rice cooking oil odor 24 hours after cooking" were conducted. Further, the cooked rice was reheated in a microwave at 500 W for 1 minute after storing it at room temperature or at 4° C. for 6 hours, 12 hours, 24 hours, and 48 hours, and then the sensory tests on "scent 6 hours after cooking", "scent 12 hours after cooking", "scent 24 hours after cooking", "scent 48 hours after cooking", "texture 48 hours after cooking", and "strength of deteriorated odor of cooking oil 24 hours after cooking" were conducted. The sensory tests on the flavor and scent of the cooked rice products were conducted by a panel consisting of ten experts using the following five levels of criteria.
Level 1 Having no or little flavor/scent
Level 2 Having significantly weaker flavor/scent than cooked rice immediately after cooking
Level 3 Having weaker flavor/scent than cooked rice immediately after cooking
Level 4 Having slightly weaker flavor/scent than cooked rice immediately after cooking
Level 5 Having similar flavor/scent to cooked rice immediately after cooking The textures of the cooked rice products were also evaluated using the following five levels of criteria.
Level 1 Very unfavorable due to overall dry/crumbly texture
Level 2 Unfavorable due to partially dry/crumbly texture
Level 3 No dry/crumbly texture but a little unfavorable since rice grains are dry
Level 4 Favorable since rice grains are not dry and having glutinous texture
Level 5 Very favorable due to moist and glutinous texture similar to cooked rice immediately after cooking Additionally, the strengths of cooking oil odor were evaluated using the following five levels of criteria.
Level 1 Having no or little odor
Level 2 Having a little odor
Level 3 Having an odor
Level 4 Having a strong odor
Level 5 Having a very strong odor It should be noted that the panel members conducted the sensory tests were familiar with the commercially available cooked rice that are usually on the market and were skilled enough to fully understand the general level ("normal" in evaluation) of each evaluation item.

(3) Evaluation Results of Test Products: The compositions of the test products No. 46 to 69, the mass compounding ratios of the component (A) and the component (B), the adding amounts of the improver for cereal processed food product with respect to the raw rice, the contents of maltol with respect to the raw rice, and the results of the sensory tests are shown in Table 4-1 to Table 4-5. It should be noted that similar sensory evaluations were conducted to the cooked rice products which have been cooked by adding 1% by mass or 5% by mass of the commercially available rice cooking oil (J-Oil Mills Inc.) to the raw rice before washing and soaking in water, and the results thereof were similar to those of the above cooked rice products which have been cooked by adding 2% by mass of the commercially available rice cooking oil (J-Oil Mills Inc.) to the raw rice. Further, the sensory evaluation results of the cooked rice products to which the improver was added before cooking were also similar to the sensory evaluation results of the cooked rice products to which the improver was added after cooking.

Example 4: Study 1 of Amounts of Component (A) and of Component (B) in Noodles (1) Preparations of Test Products: The test products having the flavor balance of "GOOD" or "EXCELLENT" as an improver for cereal processed food product in the sensory evaluations of Example 1 (i.e., test products No. 1 to 9, 11 to 14, 16 to 24, 26 to 29, 31 to 39, and 41 to 44) were added to and mixed with boiled pastas to obtain noodle test products (No. 70 to 78, 80 to 83, 85 to 93, 95 to 98, 100 to 108, and 110 to 113). The above pastas were prepared by boiling dried noodles (Nissin Foods Inc., "MA-MA Pasta" 1.6 mm) for 7 minutes, soaking in cold water for 30 minutes to remove the heat, and draining the water well with a sieve. The adding amount of the improver for cereal processed food product with respect to the dried noodles was 1% by mass. Further, noodles to which neither the component (A) nor the component (B) was added was used as a control (Comparative Example 3).

(2) Evaluation Procedure of Test Products: For the test products prepared in accordance with the above item (1) (i.e., test products No. 70 to 78, 08 to 83, 85 to 93, 95 to 98, 100 to 108, and 110 to 113), sensory tests on "fresh flavor immediately after boiling", "flavor 6 hours after boiling", "flavor 12 hours after boiling", "flavor 24 hours after boiling", and "flavor 48 hours after boiling" were conducted. Further, the boiled noodles were reheated in a microwave at 500 W for 1 minute after storing them at room temperature or at 4° C. for 6 hours, 12 hours, 24 hours, and 48 hours, and then the sensory tests on "scent 6 hours after boiling", "scent 12 hours after boiling", "scent 24 hours after boiling", "scent 48 hours after boiling", and "texture 48 hours after boiling" were conducted. The sensory tests on the flavor and scent of the boiled noodles were conducted by a panel consisting of ten experts using the following five levels of criteria.

Level 1 Having no or little flavor/scent
Level 2 Having significantly weaker flavor/scent than boiled noodles immediately after boiling
Level 3 Having weaker flavor/scent than boiled noodles immediately after boiling
Level 4 Having slightly weaker flavor/scent than boiled noodles immediately after boiling
Level 5 Having similar flavor/scent to boiled noodles immediately after boiling The textures of the boiled noodles were also evaluated using the following five levels of criteria.

Level 1 Very unfavorable due to overall dry/crumbly texture
Level 2 Unfavorable due to partially dry/crumbly texture
Level 3 No dry/crumbly texture but a little unfavorable since noodles are dry
Level 4 Favorable since noodles are not dry and having glutinous texture
Level 5 Very favorable due to moist and glutinous texture similar to noodles immediately after boiling It should be noted that the panel members conducted the sensory tests were familiar with the commercially available noodles that are usually on the market and were skilled enough to fully understand the general level ("normal" in evaluation) of each evaluation item.

(3) Evaluation Results of Test Products: The compositions of the test products (No. 70 to 78, 80 to 83, 85 to 93, 95 to 98, 100 to 108, and 110 to 113), the mass compounding ratios of the component (A) and the component (B), the adding amounts of the improver for cereal processed food product with respect to the dried noodles, the contents of maltol with respect to the dried noodles, and the results of the sensory tests are shown in Table 5-1 to Table 7-4. It should be noted that similar sensory evaluations were conducted to boiled noodles which have been produced by adding 1% by mass of the improver with respect to the dried noodles to hot water, and the results thereof were similar to those of the above boiled noodles to which the improver was added after boiling.

Example 5: Study 2 of Amounts of Component (A) and of Component (B) in Noodles (1) Preparations and Evaluation Procedure of Test Products: The improvers for cereal processed food product prepared in accordance with the item (1) of Example 3 (i.e., test products No. 46 to 49) were added to boiled noodles together with a soybean shirashimeyu (refined rapeseed oil) (J-Oil Mills Inc.). By properly stirring the noodles with the added improvers and oil, test products (No. 115 to 138) were prepared. The boiled noodles were prepared by boiling dried noodles (Nissin Foods Inc., "MA-MA Pasta" 1.6 mm) for 7 minutes, soaking in cold water for 30 minutes to remove the heat, and draining the water well with a sieve. The adding amount of the improver for cereal processed food product with respect to the dried noodles was 1% by mass. The adding amount of the soybean shirashimeyu with respect to the boiled noodles was 2% by mass. Further, noodles to which neither the component (A) nor the component (B) was added was used as a control (Comparative Example 4).

For the test products prepared as described above, sensory tests on "fresh flavor immediately after boiling", "flavor 6 hours after boiling", "flavor 12 hours after boiling", "flavor 24 hours after boiling", "flavor 48 hours after boiling", "strength of oil odor immediately after boiling", and "strength of oil odor 24 hours after boiling" were conducted. Further, the boiled noodles were reheated in a microwave at 500 W for 1 minute after storing them at room temperature or at 4° C. for 6 hours, 12 hours, 24 hours, and 48 hours, and then the sensory tests on "scent 6 hours after boiling", "scent 12 hours after boiling", "scent 24 hours after boiling", "scent 48 hours after boiling", "texture 48 hours after boiling" and "strength of deteriorated oil odor 24 hours after boiling" were conducted. The sensory tests on the flavor and scent of the boiled noodles were conducted by a panel consisting of ten experts using the following five levels of criteria.

Level 1 Having no or little flavor/scent
Level 2 Having significantly weaker flavor/scent than boiled noodles immediately after boiling
Level 3 Having weaker flavor/scent than boiled noodles immediately after boiling
Level 4 Having slightly weaker flavor/scent than boiled noodles immediately after boiling
Level 5 Having similar flavor/scent to boiled noodles immediately after boiling The textures of the boiled noodles were also evaluated using the following five levels of criteria.

Level 1 Very unfavorable due to overall dry/crumbly texture
Level 2 Unfavorable due to partially dry/crumbly texture
Level 3 No dry/crumbly texture but a little unfavorable since noodles are dry
Level 4 Favorable since noodles are not dry and having glutinous texture
Level 5 Very favorable due to moist and glutinous texture similar to noodles immediately after boiling Additionally, the strengths of oil odor 24 hours after boiling were evaluated using the following five levels of criteria.

Level 1 Having no or little odor
Level 2 Having a little odor

Level 3 Having an odor
Level 4 Having a strong odor
Level 5 Having a very strong odor It should be noted that the panel members conducted the sensory tests were familiar with the commercially available noodles that are usually on the market and were skilled enough to fully understand the general level ("normal" in evaluation) of each evaluation item.

(2) Evaluation Results of Test Products: The compositions of the test products No. 115 to 138, the mass compounding ratios of the component (A) and the component (B), the adding amounts of the improver for cereal processed food product with respect to the dried noodles, the contents of maltol with respect to the dried noodles, and the results of the sensory tests are shown in Table 8-1 to Table 8-5. It should be noted that similar sensory evaluations were conducted to the boiled noodles which have been produced by adding 1% by mass or 5% by mass of the commercially available soybean shirashimeyu (J-Oil Mills Inc.) to the dried noodle, and the results thereof were similar to those of the pastas which have been produced by adding 1% by mass of the commercially available soybean shirashimeyu (J-Oil Mills Inc.) to the boiled pastas. Further, the sensory evaluation results of the boiled noodles to which the improver was added before boiling were also similar to the sensory evaluation results of the boiled noodles to which the improver was added after boiling.

Example 6: Study on Salted Rice Products

In addition to the studies on the plain cooked rice and pastas in the above Examples, a study on salted rice products was conducted. First, the improvers for cereal processed food product prepared in accordance with the item of Example 1 (i.e., test products No. 49 to 51), salt water with a salt concentration of 24% by mass, and the rice cooking oil (J-Oil Mills Inc.) were added to raw rice after washing and soaking in water. Here, the adding amount of each component with respect to the raw rice before washing and soaking in water was 1% by mass for the improvers, 8% by mass for the salt water, and 2% by mass for the rice cooking oil. The raw rice was then added with 1.25 pts. mass of water (normal additional amount of water) per 1 pt. mass of the raw rice. After mixing the added water and the raw rice, the rice was cooked with a commercially available rice cooker in a normal way to produce the salted rice products. Further, a salted rice product to which neither the component (A) nor the component (B) was added was used as a control. These salted rice products were evaluated in accordance with the abovementioned evaluation procedures, and the effects of this disclosure were confirmed as a result.

Example 7: Study on Red Rice Products

Similarly, a study on red rice products was conducted. First, raw rice after washing and soaking in water and raw glutinous rice were mixed at a ratio of 1:3. The improvers for cereal processed food product prepared in accordance with the item of Example 1 (i.e., test products No. 49 to 51) and the rice cooking oil (J-Oil Mills Inc.) were then added to the mixed raw rice and the raw glutinous rice. Here, the adding amount of the improves was 1% by mass of the total weight of the raw rice and the raw glutinous rice. The adding amount of the rice cooking oil with respect to the total weight of the raw rice and the raw glutinous rice before washing and soaking in water was 2% by mass. The rice was then added with 1.45 pts. mass of water (normal additional amount of water) per 1 pt. mass of the total weight of the raw rice and the raw glutinous rice. Additionally, a mixture of well-cooked red beans and their broth was added at a ratio of 1:2. The total amount of the red beans and their broth added thereto was 1% by mass of the total weight of the raw rice and the raw glutinous rice. After mixing, the rice was cooked with a commercially available rice cooker in a normal way to produce the red rice products. Further, a red rice product to which neither the component (A) nor the component (B) was added was used as a control. These red rice products were evaluated in accordance with the abovementioned evaluation procedures, and the effects of this disclosure were confirmed as a result.

Example 8: Study on Kamameshi Products

Similarly, a study on kamameshi (rice boiled with various ingredients in a small pot) was conducted. First, the improvers for cereal processed food product prepared in accordance with the item (1) of Example 1 (i.e., test products No. 49 to 51), chicken thighs, and rice cooking oil (J-Oil Mills Inc.) were added to raw rice after washing and soaking in water. Additionally, a little sugar and ginger juice were added to the rice after adding soy source, sake, mirin (rice wine with low alcohol and high sugar content) thereto. Here, the adding amount of each component with respect to the raw rice before washing and soaking in water was 1% by mass for the improvers, 25% by mass for the chicken thighs, 2% by mass for the rice cooking oil, 5% by mass for soy source, 2% by mass for sake and 2% by mass for mirin. The rice was then added with 1.3 pts. mass of water (normal additional amount of water) per 1 pt. mass of the raw rice. After mixing, the rice was cooked with a commercially available rice cooker in a normal way to produce the kamameshi products. Further, a kamameshi product to which neither the component (A) nor the component (B) was added was used as a control. These kamameshi products were evaluated in accordance with the abovementioned evaluation procedures, and the effects of this disclosure were confirmed as a result.

Example 9: Study on Soba Products

Similarly, a study on soba products was conducted. First, boiled noodles were prepared by boiling raw noodles in hot water for 1 minute, removing the heat with running water, and draining the water well with a sieve. The boiled noodles were then added with the improvers for cereal processed food product prepared in accordance with the item (1) of Example 1 (i.e., test products No. 49 to 51) and soybean shirashimeyu (J-Oil Mills Inc.) to prepare soba products. Here, the adding amount of the improver with respect to the raw noodles was 1% by mass. The adding amount of the soybean shirashimeyu with respect to the boiled noodles was 2% by mass. Further, a soba product to which neither the component (A) nor the component (B) was added was used as a control. These soba products were evaluated in accordance with the abovementioned evaluation procedures, and the effects of this disclosure were confirmed as a result.

Example 10: Study on Chinese Noodles Products

Similarly, a study on Chinese noodles products was conducted. First, boiled noodles were prepared by boiling raw noodles in hot water for 2 minutes, removing the heat with running water, and draining the water well with a sieve.

The boiled noodles were then added with the improvers for cereal processed food product prepared in accordance with the item (1) of Example 1 (i.e., test products No. 49 to 51) and sesame oil (J-Oil Mills Inc.) to prepare Chinese noodles products. Here, the adding amount of the improver with respect to the raw noodles was 1% by mass. The adding amount of the sesame oil with respect to the boiled noodles were 2% by mass. Further, a Chinese noodles product to which neither the component (A) nor the component (B) was added was used as a control. These Chinese noodles products were evaluated in accordance with the abovementioned evaluation procedures, and the effects of this disclosure were confirmed as a result.

TABLE 1-1

| | | | Comparative example 1 | Test product 1 | Test product 2 | Test product 3 | Test product 4 |
|---|---|---|---|---|---|---|---|
| Improver for processed cereal food product | Content of maltol in improver | ppm | 0 | 20 | 20 | 20 | 20 |
| | Content of 5-Hydroxymethylfurfural in improver | ppm | 0 | 0 | 0.2 | 1 | 2 |
| | Mass ratio of 5-Hydroxymethylfurfural to maltol | — | 0 | 0 | 0.01 | 0.05 | 0.1 |
| Sensory evaluation of improver | Flavor of improver | Evaluation Remarks | — | EXCELLENT | EXCELLENT | EXCELLENT | EXCELLENT |
| Cooked rice | Adding amount to raw rice | % | 0 | 1 | 1 | 1 | 1 |
| | Adding amount of maltol to raw rice | ppm | 0 | 0.2 | 0.2 | 0.2 | 0.2 |
| Sensory evaluation of cooked rice | Flavor immediately after cooking | — | 5 | 5 | 5 | 5 | 5 |
| | Flavor 6 hrs. after cooking | — | 2.8 | 3.5 | 4.2 | 4.5 | 4.7 |
| | Flavor 12 hrs. after cooking | — | 2.1 | 2.5 | 4.1 | 4.3 | 4.5 |
| | Flavor 24 hrs. after cooking | — | 1.5 | 2.3 | 3.5 | 4.2 | 4.3 |
| | Flavor 48 hrs. after cooking | — | 1 | 1.6 | 3.2 | 4.1 | 4.5 |
| Sensory evaluation of reheated cooked rice | Scent 6 hrs. after cooking | — | 2.5 | 3.4 | 4.3 | 4.6 | 5 |
| | Scent 12 hrs. after cooking | — | 2.1 | 2.6 | 4.1 | 4.2 | 4.6 |
| | Scent 24 hrs. after cooking | — | 1.5 | 2.2 | 3.7 | 4.1 | 4.6 |
| | Scent 48 hrs. after cooking | — | 1 | 1.5 | 3 | 3.9 | 4.6 |
| | Texture 48 hrs. after cooking | — | 1 | 2.2 | 3.2 | 4.4 | 4.5 |

TABLE 1-2

| | | | Test product 5 | Test product 6 | Test product 7 | Test product 8 | Test product 9 |
|---|---|---|---|---|---|---|---|
| Improver for processed cereal food product | Content of maltol in improver | ppm | 20 | 20 | 20 | 20 | 20 |
| | Content of 5-Hydroxymethylfurfural in improver | ppm | 20 | 200 | 2000 | 5000 | 10000 |
| | Mass ratio of 5-Hydroxymethylfurfural to maltol | — | 1 | 10 | 100 | 250 | 500 |
| Sensory evaluation of improver | Flavor of improver | Evaluation Remarks | EXCELLENT | EXCELLENT | EXCELLENT | EXCELLENT | GOOD |
| Cooked rice | Adding amount to raw rice | % | 1 | 1 | 1 | 1 | 1 |
| | Adding amount of maltol to raw rice | ppm | 0.2 | 0.2 | 0.2 | 0.2 | 0.2 |
| Sensory evaluation of cooked rice | Flavor immediately after cooking | — | 5 | 5 | 5 | 5 | 5 |
| | Flavor 6 hrs. after cooking | — | 4.8 | 5 | 4.8 | 4.6 | 4.2 |
| | Flavor 12 hrs. after cooking | — | 4.5 | 4.6 | 4.7 | 4.4 | 4.1 |
| | Flavor 24 hrs. after cooking | — | 4.4 | 4.5 | 4.6 | 4.1 | 3.7 |

TABLE 1-2-continued

|  |  |  | Test product 5 | Test product 6 | Test product 7 | Test product 8 | Test product 9 |
|---|---|---|---|---|---|---|---|
|  | Flavor 48 hrs. after cooking | — | 4.5 | 4.3 | 4.4 | 4.2 | 3.5 |
| Sensory evaluation of reheated cooked rice | Scent 6 hrs. after cooking | — | 5 | 5 | 5 | 4.5 | 4.3 |
|  | Scent 12 hrs. after cooking | — | 4.8 | 4.9 | 5 | 4.2 | 4 |
|  | Scent 24 hrs. after cooking | — | 4.7 | 4.7 | 4.9 | 4.1 | 3.7 |
|  | Scent 48 hrs. after cooking | — | 4.7 | 4.6 | 4.6 | 4 | 3.5 |
|  | Texture 48 hrs. after cooking | — | 4.6 | 4.6 | 4.6 | 4.4 | 3.6 |

TABLE 1-3

|  |  |  | Test product 10 | Test product 11 | Test product 112 |
|---|---|---|---|---|---|
| Improver for processed cereal food product | Content of maltol in improver | ppm | 20 | 50 | 100 |
|  | Content of 5-Hydroxymethylfurfural in improver | ppm | 20000 | 100 | 200 |
|  | Mass ratio of 5-Hydroxymethylfurfural to maltol | — | 1000 | 2 | 2 |
| Sensory evaluation of improver | Flavor of improver | Evaluation | POOR | EXCELLENT | EXCELLENT |
|  |  | Remarks | Not favorable as aroma of 5-Hydroxymethylfurfural is too strong |  |  |
| Cooked rice | Adding amount to raw rice | % |  | 1 | 1 |
|  | Adding amount of maltol to raw rice | ppm |  | 0.5 | 1 |
| Sensory evaluation of cooked rice | Flavor immediately after cooking rice | — |  | 5 | 5 |
|  | Flavor 6 hrs. after cooking | — |  | 4.8 | 4.9 |
|  | Flavor 12 hrs. after cooking | — |  | 4.6 | 4.8 |
|  | Flavor 24 hrs. after cooking | — |  | 4.6 | 4.7 |
|  | Flavor 48 hrs. after cooking | — |  | 4.5 | 4.5 |
| Sensory evaluation of reheated cooked rice | Scent 6 hrs. after cooking | — |  | 5 | 5 |
|  | Scent 12 hrs. after cooking | — |  | 4.9 | 4.9 |
|  | Scent 24 hrs. after cooking | — |  | 4.9 | 4.9 |
|  | Scent 48 hrs. after cooking | — |  | 4.6 | 4.5 |
|  | Texture 48 hrs. after cooking | — |  | 4.6 | 4.7 |

TABLE 1-4

|  |  |  | Test product 13 | Test product 14 | Test product 15 |
|---|---|---|---|---|---|
| Improver for processed cereal food product | Content of maltol in improver | ppm | 250 | 500 | 1000 |
|  | Content of 5-Hydroxy-methylfurfural in improver | ppm | 500 | 1000 | 2000 |
|  | Mass ratio of 5-Hydroxy-methylfurfural to maltol | — | 2 | 2 | 2 |
| Sensory evaluation of improver | Flavor of improver | Evaluation Remarks | EXCELLENT | GOOD Aroma of malto is too strong | POOR Not favorable as aroma of maltol is too strong |
| Cooked rice | Adding amount to raw rice | % | 1 | 1 |  |
|  | Adding amount of maltol to raw rice | ppm | 2.5 | 5 |  |
| Sensory evaluation of cooked rice | Flavor immediately after cooking rice | — | 4.5 | 4.3 |  |
|  | Flavor 6 hrs. after cooking | — | 4.3 | 4.1 |  |
|  | Flavor 12 hrs. after cooking | — | 4.2 | 4 |  |
|  | Flavor 24 hrs. after cooking | — | 3.4 | 3.2 |  |
|  | Flavor 48 hrs. after cooking | — | 3.2 | 3.1 |  |
| Sensory evaluation of reheated cooked rice | Scent 6 hrs. after cooking | — | 4.3 | 4.1 |  |
|  | Scent 12 hrs. after cooking | — | 4.2 | 4 |  |
|  | Scent 24 hrs. after cooking | — | 3.4 | 3.2 |  |
|  | Scent 48 hrs. after cooking | — | 3.2 | 3.1 |  |
|  | Texture 48 hrs. after cooking | — | 4.8 | 4.5 |  |

TABLE 2-1

|  |  |  | Comparative example 1 | Test product 16 | Test product 17 | Test product 18 | Test product 19 |
|---|---|---|---|---|---|---|---|
| Improver for processed cereal food product | Content of maltol in improver | ppm | 0 | 20 | 20 | 20 | 20 |
|  | Content of dimethyl sulfide in improver | ppm | 0 | 0 | 0.0002 | 0.001 | 0.002 |
|  | Mass ratio of dimethyl sulfide to maltol | — | 0 | 0 | 0.00001 | 0.00005 | 0.0001 |
| Sensory evaluation of improver | Flavor of improver | Evaluation Remarks | — | EXCELLENT | EXCELLENT | EXCELLENT | EXCELLENT |
| Cooked rice | Adding amount to raw rice | % | 0 | 1 | 1 | 1 | 1 |
|  | Adding amount of maltol to raw rice | ppm | 0 | 0.2 | 0.2 | 0.2 | 0.2 |
| Sensory evaluation of cooked rice | Flavor immediately after cooking | — | 5 | 5 | 5 | 5 | 5 |
|  | Flavor 6 hrs. after cooking | — | 2.7 | 3.6 | 4.2 | 4.6 | 4.7 |
|  | Flavor 12 hrs. after cooking | — | 2.2 | 2.6 | 4.1 | 4.5 | 4.5 |
|  | Flavor 24 hrs. after cooking | — | 1.6 | 2.2 | 3.3 | 4.3 | 4.5 |
|  | Flavor 48 hrs. after cooking | — | 1 | 1.5 | 3.1 | 4.2 | 4.5 |

TABLE 2-1-continued

|  |  |  | Comparative example 1 | Test product 16 | Test product 17 | Test product 18 | Test product 19 |
|---|---|---|---|---|---|---|---|
| Sensory evaluation of reheated cooked rice | Scent 6 hrs. after cooking | — | — | 2.8 | 3.5 | 4.2 | 4.5 | 4.8 |
|  | Scent 12 hrs. after cooking | — | — | 2.1 | 2.5 | 4.1 | 4.3 | 4.7 |
|  | Scent 24 hrs. after cooking | — | — | 1.5 | 2.3 | 3.5 | 4.2 | 4.6 |
|  | Scent 48 hrs. after cooking | — | — | 1 | 1.6 | 3.2 | 4.1 | 4.5 |
|  | Texture 48 hrs. after cooking | — | — | 1 | 2.3 | 3.5 | 4.4 | 4.6 |

TABLE 2-2

|  |  |  | Test product 20 | Test product 21 | Test product 22 | Test product 23 | Test product 24 |
|---|---|---|---|---|---|---|---|
| Improver for processed cereal food product | Content of maltol in improver | ppm | 20 | 20 | 20 | 20 | 20 |
|  | Content of dimethyl sulfide in improver | ppm | 0.02 | 0.2 | 2 | 10 | 20 |
|  | Mass ratio of dimethyl sulfide to maltol | — | 0.001 | 0.01 | 0.1 | 0.5 | 1 |
| Sensory evaluation of improver | Flavor of improver | Evaluation Remarks | EXCELLENT | EXCELLENT | EXCELLENT | EXCELLENT | GOOD |
| Cooked rice | Adding amount to raw rice | % | 1 | 1 | 1 | 1 | 1 |
|  | Adding amount of maltol to raw rice | ppm | 0.2 | 0.2 | 0.2 | 0.2 | 0.2 |
| Sensory evaluation of cooked rice | Flavor immediately after cooking | — | 5 | 5 | 5 | 5 | 5 |
|  | Flavor 6 hrs. after cooking | — | 4.8 | 4.8 | 4.8 | 4.7 | 4.3 |
|  | Flavor 12 hrs. after cooking | — | 4.6 | 4.7 | 4.7 | 4.5 | 4 |
|  | Flavor 24 hrs. after cooking | — | 4.5 | 4.6 | 4.7 | 4.2 | 3.7 |
|  | Flavor 48 hrs. after cooking | — | 4.5 | 4.5 | 4.6 | 4.1 | 3.5 |
| Sensory evaluation of reheated cooked rice | Scent 6 hrs. after cooking | — | 4.9 | 4.8 | 4.9 | 4.6 | 4.2 |
|  | Scent 12 hrs. after cooking | — | 4.8 | 4.6 | 4.8 | 4.4 | 4.1 |
|  | Scent 24 hrs. after cooking | — | 4.7 | 4.8 | 4.9 | 4.1 | 3.7 |
|  | Scent 48 hrs. after cooking | — | 4.6 | 4.7 | 4.7 | 4.2 | 3.5 |
|  | Texture 48 hrs. after cooking | — | 4.8 | 4.5 | 4.6 | 4.4 | 3.5 |

TABLE 2-3

|  |  |  | Test product 25 | Test product 26 | Test product 27 |
|---|---|---|---|---|---|
| Improver for processed cereal food product | Content of maltol in improver | ppm | 20 | 50 | 100 |
|  | Content of dimethyl sulfide in improver | ppm | 100 | 0.1 | 0.2 |
|  | Mass ratio of dimethyl sulfide to maltol | — | 5 | 0.002 | 0.002 |

TABLE 2-3-continued

|  |  |  | Test product 25 | Test product 26 | Test product 27 |
|---|---|---|---|---|---|
| Sensory evaluation of improver | Flavor of improver | Evaluation Remarks | POOR Not favorable as aroma of dimethyl sulfide is too strong | EXCELLENT | EXCELLENT |
| Cooked rice | Adding amount to raw rice | % |  | 1 | 1 |
|  | Adding amount of maltol to raw rice | ppm |  | 0.5 | 1 |
| Sensory evaluation of cooked rice | Flavor immediately after cooking | — |  | 5 | 5 |
|  | Flavor 6 hrs. after cooking | — |  | 4.9 | 4.9 |
|  | Flavor 12 hrs. after cooking | — |  | 4.7 | 4.8 |
|  | Flavor 24 hrs. after cooking | — |  | 4.7 | 4.6 |
|  | Flavor 48 hrs. after cooking | — |  | 4.6 | 4.5 |
| Sensory evaluation of reheated cooked rice | Scent 6 hrs. after cooking | — |  | 5 | 5 |
|  | Scent 12 hrs. after cooking | — |  | 4.9 | 5 |
|  | Scent 24 hrs. after cooking | — |  | 4.8 | 4.9 |
|  | Scent 48 hrs. after cooking | — |  | 4.8 | 4.5 |
|  | Texture 48 hrs. after cooking | — |  | 4.7 | 4.8 |

TABLE 2-4

|  |  |  | Test product 28 | Test product 29 | Test product 30 |
|---|---|---|---|---|---|
| Improver for processed cereal food product | Content of maltol in improver | ppm | 250 | 500 | 1000 |
|  | Content of dimethyl sulfide in improver | ppm | 0.5 | 1 | 1 |
|  | Mass ratio of dimethyl sulfide in maltol | — | 0.002 | 0.002 | 0.01 |
| Sensory evaluation of improver | Flavor of improver | Evaluation Remarks | EXCELLENT | Good Aroma of malto is strong | POOR Not favorable as aroma of maltol is too strong |
| Cooked rice | Adding amount to raw rice | % | 1 | 1 |  |
|  | Adding amount of maltol to raw rice | ppm | 2.5 | 5 |  |
| Sensory evaluation of cooked rice | Flavor immediately after cooking | — | 4.4 | 4.2 |  |
|  | Flavor 6 hrs. after cooking | — | 4.2 | 3.9 |  |
|  | Flavor 12 hrs. after cooking | — | 3.9 | 3.7 |  |
|  | Flavor 24 hrs. after cooking | — | 3.6 | 3.1 |  |
|  | Flavor 48 hrs. after cooking | — | 3.4 | 3 |  |
| Sensory evaluation of reheated cooked rice | Scent 6 hrs. after cooking | — | 4.3 | 4.1 |  |
|  | Scent 12 hrs. after cooking | — | 4.2 | 4 |  |
|  | Scent 24 hrs. after cooking | — | 3.4 | 3.2 |  |

TABLE 2-4-continued

|  |  |  | Test product 28 | Test product 29 | Test product 30 |
|---|---|---|---|---|---|
|  | Scent 48 hrs. after cooking | — | — | 3.2 | 3.1 |
|  | Texture 48 hrs. after cooking | — | — | 4.6 | 4.6 |

TABLE 3-1

|  |  |  | Comparative example 1 | Test product 31 | Test product 32 | Test product 33 | Test product 34 |
|---|---|---|---|---|---|---|---|
| Improver for processed cereal food product | Content of maltol in improver | ppm | 0 | 20 | 20 | 20 | 20 |
|  | Content of 3-methylbutanal in improver | ppm | 0 | 0 | 0.0002 | 0.001 | 0.002 |
|  | Mass ratio of 3-methylbutanal to maltol | — | 0 | 0 | 0.00001 | 0.00005 | 0.0001 |
| Sensory evaluation of improver | Flavor of improver | Evaluation Remarks | — | EXCELLENT | EXCELLENT | EXCELLENT | EXCELLENT |
| Cooked rice | Adding amount to raw rice | % | 0 | 1 | 1 | 1 | 1 |
|  | Adding amount of maltol to raw rice | ppm | 0 | 0.2 | 0.2 | 0.2 | 0.2 |
| Sensory evaluation of cooked rice | Flavor immediately after cooking | — | — | 5 | 5 | 5 | 5 |
|  | Flavor 6 hrs. after cooking | — | 2.9 | 3.7 | 4.3 | 4.7 | 4.8 |
|  | Flavor 12 hrs. after cooking | — | 2.2 | 2.6 | 4.2 | 4.5 | 4.6 |
|  | Flavor 24 hrs. after cooking | — | 1.6 | 2.4 | 3.9 | 4.5 | 4.5 |
|  | Flavor 48 hrs. after cooking | — | 1 | 1.5 | 3.6 | 4.5 | 4.6 |
| Sensory evaluation of reheated cooked rice | Scent 6 hrs. after cooking | — | 2.7 | 3.7 | 4.2 | 4.7 | 4.8 |
|  | Scent 12 hrs. after cooking | — | 2.1 | 2.7 | 4.1 | 4.6 | 4.6 |
|  | Scent 24 hrs. after cooking | — | 1.7 | 2.2 | 3.7 | 4.5 | 4.4 |
|  | Scent 48 hrs. after cooking | — | 1.1 | 1.5 | 3.5 | 4.5 | 4.4 |
|  | Texture 48 hrs. after cooking | — | 1 | 2.2 | 3.7 | 4.6 | 4.6 |

TABLE 3-2

|  |  |  | Test product 35 | Test product 36 | Test product 37 | Test product 38 | Test product 39 |
|---|---|---|---|---|---|---|---|
| Improver for processed cereal food product | Content of maltol in improver | ppm | 20 | 20 | 20 | 20 | 20 |
|  | Content of 3-methylbutanal in improver | ppm | 0.02 | 0.2 | 2 | 10 | 20 |
|  | Mass ratio of 3-methylbutanal to maltol | — | 0.001 | 0.01 | 0.1 | 0.5 | 1 |
| Sensory evaluation of improver | Flavor of improver | Evaluation Remarks | EXCELLENT | EXCELLENT | EXCELLENT | EXCELLENT | GOOD |
| Cooked rice | Adding amount to raw rice | % | 1 | 1 | 1 | 1 | 1 |
|  | Adding amount of maltol to raw rice | ppm | 0.2 | 0.2 | 0.2 | 0.2 | 0.2 |

TABLE 3-2-continued

|  |  |  | Test product 35 | Test product 36 | Test product 37 | Test product 38 | Test product 39 |
|---|---|---|---|---|---|---|---|
| Sensory evaluation of cooked rice | Flavor immediately after cooking | — | 5 | 5 | 5 | 5 | 5 |
|  | Flavor 6 hrs. after cooking | — | 4.7 | 4.7 | 4.9 | 4.7 | 4.4 |
|  | Flavor 12 hrs. after cooking | — | 4.5 | 4.5 | 4.8 | 4.5 | 4.2 |
|  | Flavor 24 hrs. after cooking | — | 4.5 | 4.6 | 4.5 | 4.1 | 3.7 |
|  | Flavor 48 hrs. after cooking | — | 4.7 | 4.5 | 4.7 | 3.8 | 3.5 |
| Sensory evaluation of reheated cooked rice | Scent 6 hrs. after cooking | — | 4.9 | 4.9 | 4.8 | 4.6 | 4.4 |
|  | Scent 12 hrs. after cooking | — | 4.6 | 4.7 | 4.8 | 4.5 | 4.3 |
|  | Scent 24 hrs. after cooking | — | 4.6 | 4.5 | 4.7 | 4.2 | 3.8 |
|  | Scent 48 hrs. after cooking | — | 4.5 | 4.4 | 4.4 | 4.1 | 3.6 |
|  | Texture 48 hrs. after cooking | — | 4.7 | 4.5 | 4.7 | 4.3 | 3.1 |

TABLE 3-3

|  |  |  | Test product 40 | Test product 41 | Test product 42 |
|---|---|---|---|---|---|
| Improver for processed cereal food product | Content of maltol in improver | ppm | 20 | 50 | 100 |
|  | Content of 3-methylbutanal in improver | ppm | 40 | 0.05 | 0.1 |
|  | Mass ratio of 3-methylbutanal t0 maltol | — | 2 | 0.001 | 0.001 |
| Sensory evaluation of improver | Flavor of improver | Evaluation Remarks | POOR Not favorable as aroma of 3-methylbutanal is too strong | EXCELLENT | EXCELLENT |
| Cooked rice | Adding amount to raw rice | % |  | 1 | 1 |
|  | Adding amount of maltol to raw rice | ppm |  | 0.5 | 1 |
| Sensory evaluation of cooked rice | Flavor immediately after cooking | — |  | 5 | 5 |
|  | Flavor 6 hrs. after cooking | — |  | 4.9 | 4.8 |
|  | Flavor 12 hrs. after cooking | — |  | 4.7 | 4.7 |
|  | Flavor 24 hrs. after cooking | — |  | 4.6 | 4.5 |
|  | Flavor 48 hrs. after cooking | — |  | 4.5 | 4.7 |
| Sensory evaluation of reheated cooked rice | Scent 6 hrs. after cooking | — |  | 5 | 5 |
|  | Scent 12 hrs. after cooking | — |  | 5 | 5 |
|  | Scent 24 hrs. after cooking | — |  | 4.9 | 4.7 |
|  | Scent 48 hrs. after cooking | — |  | 4.6 | 4.6 |
|  | Texture 48 hrs. after cooking | — |  | 4.6 | 4.5 |

TABLE 3-4

|  |  |  | Test product 43 | Test product 44 | Test product 45 |
|---|---|---|---|---|---|
| Improver for processed cereal food product | Content of maltol in improver | ppm | 250 | 500 | 1000 |
|  | Content of 3-methylbutanal in improver | ppm | 0.25 | 0.5 | 1 |
|  | Mass ratio of 3-methylbutanal to maltol | — | 0.001 | 0.001 | 0.01 |
| Sensory evaluation of improver | Flavor of improver | Evaluation Remarks | EXCELLENT | Good Aroma of maltol is strong | POOR Not favorable as aroma of maltol is too strong |
| Cooked rice | Adding amount to raw rice | % |  | 1 |  |
|  | Adding amount of maltol to raw rice | ppm | 2.5 | 5 |  |
| Sensory evaluation of cooked rice | Flavor immediately after cooking | — | 4.6 | 4.2 |  |
|  | Flavor 6 hrs. after cooking | — | 4.4 | 3.8 |  |
|  | Flavor 12 hrs. after cooking | — | 4.2 | 3.6 |  |
|  | Flavor 24 hrs. after cooking | — | 3.7 | 3.3 |  |
|  | Flavor 48 hrs. after cooking | — | 3.1 | 3 |  |
| Sensory evaluation of reheated cooked rice | Scent 6 hrs. after cooking | — | 4.3 | 4.1 |  |
|  | Scent 12 hrs. after cooking | — | 4.2 | 4 |  |
|  | Scent 24 hrs. after cooking | — | 3.4 | 3.2 |  |
|  | Scent 48 hrs. after cooking | — | 3.1 | 3 |  |
|  | Texture 48 hrs. after cooking | — | 4.4 | 4.4 |  |

TABLE 4-1

|  |  |  | Comparative example 2 | Test product 46 | Test product 47 | Test product 48 | Test product 49 |
|---|---|---|---|---|---|---|---|
| Improver for processed cereal food product | Content of maltol in improver | ppm | 0 | 30 | 30 | 30 | 30 |
|  | Content of 5-Hydroxymethylfurfural in improver | ppm | 0 | 66 | 0 | 0 | 66 |
|  | Content of dimethyl sulfide in improver | ppm | 0 | 0 | 0.09 | 0.09 | 0.03 |
|  | Content of 3-methylbutanal in improver | ppm | 0 | 0 | 0 | 0.3 | 0.03 |
|  | Mass ratio of 5-Hydroxymethylfurfural to maltol | — | — | 2.2 | 0 | 0 | 2.2 |
|  | Mass ratio of dimethyl sulfide r to maltol | — | — | 0 | 0.003 | 0.003 | 0.001 |
|  | Mass ratio of 3-methylbutanal to maltol | — | — | 0 | 0 | 0.01 | 0.001 |
|  | Mass ratio of Component (B) to Component (A) | — | — | 2.2 | 0.003 | 0.013 | 2.202 |
| Sensory evaluation of improver | Flavor of improver | Evaluation Remarks | — | EXCELLENT | EXCELLENT | EXCELLENT | EXCELLENT |
| Cooked rice | Adding amount to raw rice | % | 0 | 1 | 1 | 1 | 1 |
|  | Adding amount of maltol to raw rice | ppm | 0 | 0.3 | 0.3 | 0.3 | 0.3 |

TABLE 4-1-continued

|  |  |  | Comparative example 2 | Test product 46 | Test product 47 | Test product 48 | Test product 49 |
|---|---|---|---|---|---|---|---|
| Sensory evaluation of cooked rice | Flavor immediately after cooking | — | — | 5 | 5 | 5 | 5 | 5 |
|  | Flavor 6 hrs. after cooking | — | 2.8 | 4.8 | 4.9 | 4.9 | 5 |
|  | Flavor 12 hrs. after cooking | — | 2.1 | 4.7 | 4.9 | 4.8 | 4.9 |
|  | Flavor 24 hrs. after cooking | — | 1.5 | 4.6 | 4.6 | 4.8 | 4.9 |
|  | Flavor 48 hrs. after cooking | — | 1 | 4.5 | 4.5 | 4.8 | 4.9 |
|  | Strength of rice cooking oil odor immediately after cooking | — | 3.6 | 1.4 | 1.5 | 1.2 | 1 |
|  | Strength of rice cooking oil 24 hrs. after cooking | — | 5 | 2.7 | 2.6 | 2.1 | 1.1 |
| Sensory evaluation of reheated cooked rice | Scent 6 hrs. after cooking | — | 2.8 | 5 | 5 | 5 | 5 |
|  | Scent 12 hrs. after cooking | — | 2.1 | 4.9 | 4.9 | 5 | 4.9 |
|  | Scent 24 hrs. after cooking | — | 1.5 | 4.8 | 4.9 | 4.8 | 4.9 |
|  | Scent 48 hrs. after cooking | — | 1 | 4.7 | 4.8 | 4.8 | 4.9 |
|  | Texture 48 hrs. after cooking | — | 1 | 4.4 | 4.5 | 4.8 | 5 |
|  | Strength of deteriorated odor of rice cooking oil 24 hrs. after cooking | — | 5 | 2.6 | 2.9 | 2.3 | 1 |

TABLE 4-2

|  |  |  | Test product 50 | Test product 51 | Test product 51 | Test product 53 | Test product 54 |
|---|---|---|---|---|---|---|---|
| Improver for processed cereal food product | Content of maltol in improver | ppm | 30 | 30 | 10 | 10 | 10 |
|  | Content of 5-Hydroxymethylfurfural in improver | ppm | 90 | 150 | 22 | 22 | 22 |
|  | Content of dimethyl sulfide in improver | ppm | 0.09 | 0.15 | 0.01 | 0.01 | 0.01 |
|  | Content of 3-methylbutanal in improver | ppm | 0.024 | 0.3 | 0.01 | 0.01 | 0.01 |
|  | Mass ratio of 5-Hydroxymethylfurfural to maltol | — | 3 | 5 | 2.2 | 2.2 | 2.2 |
|  | Mass ratio of dimethyl sulfide r to maltol | — | 0.003 | 0.005 | 0.001 | 0.001 | 0.001 |
|  | Mass ratio of 3-methylbutanal to maltol | — | 0.0008 | 0.01 | 0.001 | 0.001 | 0.001 |
|  | Mass ratio of Component (B) to Component (A) | — | 3.0038 | 5.015 | 2.202 | 2.202 | 2.202 |
| Sensory evaluation of improver | Flavor of improver | Evaluation Remarks | EXCELLENT | EXCELLENT | EXCELLENT | EXCELLENT | EXCELLENT |
| Cooked rice | Adding amount to raw rice | % | 1 | 1 | 0.1 | 0.5 | 1 |
|  | Adding amount of maltol to raw rice | ppm | 0.3 | 0.3 | 0.01 | 0.05 | 0.1 |
| Sensory evaluation of cooked rice | Flavor immediately after cooking | — | 5 | 5 | 5 | 5 | 5 |
|  | Flavor 6 hrs. after cooking | — | 5 | 5 | 4.8 | 4.9 | 5 |
|  | Flavor 12 hrs. after cooking | — | 4.9 | 4.9 | 4.8 | 4.8 | 4.8 |
|  | Flavor 24 hrs. after cooking | — | 4.9 | 5 | 4.7 | 4.8 | 4.8 |
|  | Flavor 48 hrs. after cooking | — | 4.9 | 4.9 | 4.7 | 4.7 | 4.8 |
|  | Strength of rice cooking oil odor immediately after cooking | — | 1 | 1 | 1.6 | 1 | 1 |

TABLE 4-2-continued

|  |  |  | Test product 50 | Test product 51 | Test product 51 | Test product 53 | Test product 54 |
| --- | --- | --- | --- | --- | --- | --- | --- |
|  | Strength of rice cooking oil 24 hrs. after cooking | — | 1.2 | 1.1 | 2.2 | 1.5 | 1.2 |
| Sensory evaluation of reheated cooked rice | Scent 6 hrs. after cooking | — | 5 | 5 | 5 | 5 | 5 |
|  | Scent 12 hrs. after cooking | — | 5 | 5 | 4.8 | 5 | 4.9 |
|  | Scent 24 hrs. after cooking | — | 4.9 | 4.8 | 4.7 | 4.8 | 4.9 |
|  | Scent 48 hrs. after cooking | — | 4.8 | 4.7 | 4.7 | 4.7 | 4.9 |
|  | Texture 48 hrs. after cooking | — | 5 | 4.9 | 4.4 | 4.6 | 5 |
|  | Strength of deteriorated odor of rice cooking oil 24 hrs. after cooking | — | 1 | 1 | 2.5 | 1.5 | 1.1 |

TABLE 4-3

|  |  |  | Test product 55 | Test product 56 | Test product 57 | Test product 58 | Test product 59 |
| --- | --- | --- | --- | --- | --- | --- | --- |
| Improver for processed cereal food product | Content of maltol in improver | ppm | 10 | 10 | 10 | 0.05 | 0.1 |
|  | Content of 5-Hydroxymethylfurfural in improver | ppm | 22 | 22 | 22 | 0.11 | 0.22 |
|  | Content of dimethyl sulfide in improver | ppm | 0.01 | 0.01 | 0.01 | 0.00005 | 0.0001 |
|  | Content of 3-methylbutanal in improver | ppm | 0.01 | 0.01 | 0.01 | 0.00005 | 0.0001 |
|  | Mass ratio of 5-Hydroxymethylfurfural to maltol | — | 2.2 | 2.2 | 2.2 | 2.2 | 2.2 |
|  | Mass ratio of dimethyl sulfide r to maltol | — | 0.001 | 0.001 | 0.001 | 0.001 | 0.001 |
|  | Mass ratio of 3-methylbutanal to maltol | — | 0.001 | 0.001 | 0.001 | 0.001 | 0.001 |
|  | Mass ratio of Component (B) to Component (A) | — | 2.202 | 2.202 | 2.202 | 2.202 | 2.202 |
| Sensory evaluation of improver | Flavor of improver | Evaluation Remarks | EXCELLENT | EXCELLENT | EXCELLENT | EXCELLENT | EXCELLENT |
| Cooked rice | Adding amount to raw rice | % | 10 | 20 | 50 | 20 | 10 |
|  | Adding amount of maltol to raw rice | ppm | 1 | 2 | 5 | 0.01 | 0.01 |
| Sensory evaluation of cooked rice | Flavor immediately after cooking | — | 5 | 5 | 5 | 4.9 | 5 |
|  | Flavor 6 hrs. after cooking | — | 5 | 4.9 | 4.7 | 4.9 | 4.9 |
|  | Flavor 12 hrs. after cooking | — | 4.8 | 4.8 | 4.7 | 4.9 | 4.9 |
|  | Flavor 24 hrs. after cooking | — | 4.8 | 4.6 | 4.6 | 4.7 | 4.6 |
|  | Flavor 48 hrs. after cooking | — | 4.9 | 4.4 | 4.6 | 4.6 | 4.5 |
|  | Strength of rice cooking oil odor immediately after cooking | — | 1 | 1.5 | 1.5 | 1.4 | 1.5 |
|  | Strength of rice cooking oil 24 hrs. after cooking | — | 1.1 | 1.8 | 2.4 | 2.6 | 1.6 |
| Sensory evaluation of reheated cooked rice | Scent 6 hrs. after cooking | — | 5 | 5 | 5 | 4.9 | 5 |
|  | Scent 12 hrs. after cooking | — | 4.9 | 4.8 | 4.8 | 4.8 | 4.9 |
|  | Scent 24 hrs. after cooking | — | 4.9 | 4.8 | 4.7 | 4.8 | 4.9 |
|  | Scent 48 hrs. after cooking | — | 4.9 | 4.7 | 4.7 | 4.7 | 4.8 |
|  | Texture 48 hrs. after cooking | — | 4.8 | 4.5 | 4.5 | 4.5 | 4.5 |

TABLE 4-3-continued

|  |  | Test product 55 | Test product 56 | Test product 57 | Test product 58 | Test product 59 |
|---|---|---|---|---|---|---|
| Strength of deteriorated odor of rice cooking oil 24 hrs. after cooking | — | 1 | 1.6 | 2.3 | 2.5 | 1.7 |

TABLE 4-4

|  |  |  | Test product 60 | Test product 61 | Test product 62 | Test product 63 | Test product 64 |
|---|---|---|---|---|---|---|---|
| Improver for processed cereal food product | Content of maltol in improver | ppm | 0.5 | 50 | 100 | 500 | 20 |
|  | Content of 5-Hydroxymethylfurfural in improver | ppm | 1.1 | 110 | 220 | 1100 | 0.2 |
|  | Content of dimethyl sulfide in improver | ppm | 0.0005 | 0.05 | 0.1 | 0.5 | 0.0002 |
|  | Content of 3-methylbutanal in improver | ppm | 0.0005 | 0.05 | 0.1 | 0.5 | 0.0002 |
|  | Mass ratio of 5-Hydroxymethlylfurfural to maltol | — | 2.2 | 2.2 | 2.2 | 2.2 | 0.01 |
|  | Mass ratio of dimethyl sulfide r to maltol | — | 0.001 | 0.001 | 0.001 | 0.001 | 0.00001 |
|  | Mass ratio of 3-methylbutanal to maltol | — | 0.001 | 0.001 | 0.001 | 0.001 | 0.00001 |
|  | Mass ratio of Component (B) to Component (A) | — | 2.202 | 2.202 | 2.202 | 2.202 | 0.01002 |
| Sensory evaluation of improver | Flavor of improver | Evaluation Remarks | EXCELLENT | EXCELLENT | EXCELLENT | EXCELLENT | EXCELLENT |
| Cooked rice | Adding amount to raw rice | % | 2 | 10 | 5 | 1 | 0.05 |
|  | Adding amount of maltol to raw rice | ppm | 0.01 | 5 | 5 | 5 | 0.01 |
| Sensory evaluation of cooked rice | Flavor immediately after cooking | — | 5 | 5 | 5 | 5 | 5 |
|  | Flavor 6 hrs. after cooking | — | 5 | 5 | 4.9 | 4.8 | 4.8 |
|  | Flavor 12 hrs. after cooking | — | 4.9 | 4.9 | 4.8 | 4.8 | 4.8 |
|  | Flavor 24 hrs. after cooking | — | 4.9 | 5 | 4.6 | 4.7 | 4.7 |
|  | Flavor 48 hrs. after cooking | — | 4.8 | 4.9 | 4.5 | 4.7 | 4.6 |
|  | Strength of rice cooking oil odor immediately after cooking | — | 1 | 1 | 1.5 | 1.4 | 1.4 |
|  | Strength of rice cooking oil 24 hrs. after cooking | — | 1.1 | 1.1 | 1.8 | 2.7 | 2.7 |
| Sensory evaluation of reheated cooked rice | Scent 6 hrs. after cooking | — | 5 | 5 | 5 | 5 | 5 |
|  | Scent 12 hrs. after cooking | — | 5 | 5 | 4.9 | 4.8 | 4.9 |
|  | Scent 24 hrs. after cooking | — | 4.9 | 5 | 4.7 | 4.7 | 4.8 |
|  | Scent 48 hrs. after cooking | — | 4.8 | 5 | 4.7 | 4.7 | 4.7 |
|  | Texture 48 hrs. after cooking | — | 4.7 | 4.9 | 4.5 | 4.3 | 4.4 |
|  | Strength of deteriorated odor of rice cooking oil 24 hrs. after cooking | — | 1 | 1 | 1.9 | 2.7 | 2.7 |

TABLE 4-5

|  |  |  | Test product 65 | Test product 66 | Test product 67 | Test product 68 | Test product 69 |
|---|---|---|---|---|---|---|---|
| Improver for processed cereal food product | Content of maltol in improver | ppm | 20 | 20 | 20 | 20 | 20 |
|  | Content of 5-Hydroxymethylfurfural in improver | ppm | 1 | 2 | 2000 | 5000 | 10000 |

TABLE 4-5-continued

|  |  |  | Test product 65 | Test product 66 | Test product 67 | Test product 68 | Test product 69 |
|---|---|---|---|---|---|---|---|
|  | Content of dimethyl sulfide in improver | ppm | 0.001 | 0.002 | 2 | 10 | 20 |
|  | Content of 3-methylbutanal in improver | ppm | 0.001 | 0.002 | 2 | 10 | 20 |
|  | Mass ratio of 5-Hydroxymethylfurfural to maltol | — | 0.05 | 0.1 | 100 | 250 | 500 |
|  | Mass ratio of dimethyl sulfide r to maltol | — | 0.0005 | 0.0001 | 0.1 | 0.5 | 1 |
|  | Mass ratio of 3-methylbutanal to maltol | — | 0.0005 | 0.0001 | 0.1 | 0.5 | 1 |
|  | Mass ratio of Component (B) to Component (A) | — | 0.0501 | 0.1002 | 100.2 | 251 | 502 |
| Sensory evaluation of improver | Flavor of improver | Evaluation Remarks | EXCELLENT | EXCELLENT | EXCELLENT | EXCELLENT | EXCELLENT |
| Cooked rice | Adding amount to raw rice | % | 0.05 | 0.05 | 25 | 25 | 25 |
|  | Adding amount of maltol to raw rice | ppm | 0.01 | 0.01 | 5 | 5 | 5 |
| Sensory evaluation of cooked rice | Flavor immediately after cooking | — | 5 | 5 | 5 | 5 | 5 |
|  | Flavor 6 hrs. after cooking | — | 4.9 | 4.9 | 5 | 4.9 | 4.9 |
|  | Flavor 12 hrs. after cooking | — | 4.9 | 4.9 | 4.8 | 4.9 | 4.8 |
|  | Flavor 24 hrs. after cooking | — | 4.6 | 4.9 | 4.7 | 4.6 | 4.7 |
|  | Flavor 48 hrs. after cooking | — | 4.5 | 4.8 | 4.6 | 4.5 | 4.6 |
|  | Strength of rice cooking oil odor immediately after cooking | — | 1.5 | 1 | 1 | 1.5 | 1.4 |
|  | Strength of rice cooking oil 24 hrs. after cooking | — | 1.6 | 1.1 | 1.1 | 1.4 | 2.7 |
| Sensory evaluation of reheated cooked rice | Scent 6 hrs. after cooking | — | 5 | 5 | 5 | 5 | 5 |
|  | Scent 12 hrs. after cooking | — | 4.9 | 4.9 | 5 | 4.9 | 4.8 |
|  | Scent 24 hrs. after cooking | — | 4.9 | 4.8 | 4.8 | 4.8 | 4.8 |
|  | Scent 48 hrs. after cooking | — | 4.8 | 4.7 | 4.8 | 4.8 | 4.7 |
|  | Texture 48 hrs. after cooking | — | 4.5 | 4.7 | 5 | 4.5 | 4.4 |
|  | Strength of deteriorated odor of rice cooking oil 24 hrs. after cooking | — | 1.5 | 1 | 1 | 1.3 | 2.7 |

TABLE 5-1

|  |  |  | Comparative example 3 | Test product 70 | Test product 71 | Test product 72 | Test product 73 |
|---|---|---|---|---|---|---|---|
| Improver for processed cereal food product | Content of maltol in improver | ppm | 0 | 20 | 20 | 20 | 20 |
|  | Content of 5-Hydroxymethylfurfural in improver | ppm | 0 | 0 | 0.2 | 1 | 2 |
|  | Mass ratio of 5-Hydroxymethylfurfural to maltol | — | 0 | 0 | 0.01 | 0.05 | 0.1 |
| Noodles | Adding amount to dried noodles | % | 0 | 1 | 1 | 1 | 1 |
|  | Adding amount of maltol to dried noodles | ppm | 0 | 0.2 | 0.2 | 0.2 | 0.2 |
| Sensory evaluation of noodles | Flavor immediately after boiling | — | 5 | 5 | 5 | 5 | 5 |
|  | Flavor 6 hrs. after boiling | — | 2.9 | 3.5 | 4.4 | 4.6 | 4.8 |
|  | Flavor 12 hrs. after boiling | — | 2.2 | 2.6 | 4.1 | 4.3 | 4.7 |
|  | Flavor 24 hrs. after boiling | — | 1.5 | 2.3 | 3.5 | 4.3 | 4.4 |
|  | Flavor 48 hrs. after boiling | — | 1 | 1.6 | 3.2 | 4.1 | 4.3 |
| Sensory evaluation of reheated noodles | Scent 6 hrs. after boiling | — | 2.7 | 3.7 | 4.3 | 4.7 | 4.8 |
|  | Scent 12 hrs. after boiling | — | 2.2 | 2.8 | 4.3 | 4.6 | 4.6 |
|  | Scent 24 hrs. after boiling | — | 1.7 | 2.2 | 3.7 | 4.5 | 4.6 |
|  | Scent 48 hrs. after boiling | — | 1.1 | 1.5 | 3.5 | 4.5 | 4.4 |
|  | Texture 48 hrs. after boiling | — | 1 | 2.2 | 3.7 | 4.6 | 4.6 |

TABLE 5-2

|  |  |  | Test product 74 | Test product 75 | Test product 76 | Test product 77 | Test product 78 |
|---|---|---|---|---|---|---|---|
| Improver for processed cereal food product | Content of maltol in improver | ppm | 20 | 20 | 20 | 20 | 20 |
|  | Content of 5-Hydroxymethylfurfural in improver | ppm | 20 | 200 | 2000 | 5000 | 10000 |
|  | Mass ratio of 5-Hydroxymethlylfurfural to maltol | — | 1 | 10 | 100 | 250 | 500 |
| Noodles | Adding amount to dried noodles | % | 1 | 1 | 1 | 1 | 1 |
|  | Adding amount of maltol to dried noodles | ppm | 0.2 | 0.2 | 0.2 | 0.2 | 0.2 |
| Sensory evaluation of noodles | Flavor immediately after boiling | — | 5 | 5 | 5 | 5 | 5 |
|  | Flavor 6 hrs. after boiling | — | 4.8 | 4.8 | 4.8 | 4.6 | 4.2 |
|  | Flavor 12 hrs. after boiling | — | 4.8 | 4.8 | 4.6 | 4.4 | 4.1 |
|  | Flavor 24 hrs. after boiling | — | 4.6 | 4.7 | 4.6 | 4.2 | 4.1 |
|  | Flavor 48 hrs. after boiling | — | 4.4 | 4.5 | 4.5 | 4.2 | 3.5 |
| Sensory evaluation of reheated noodles | Scent 6 hrs. after boiling | — | 4.9 | 4.9 | 4.8 | 4.6 | 4.4 |
|  | Scent 12 hrs. after boiling | — | 4.8 | 4.9 | 4.8 | 4.5 | 4.3 |
|  | Scent 24 hrs. after boiling | — | 4.6 | 4.5 | 4.5 | 4.5 | 4.3 |
|  | Scent 48 hrs. after boiling | — | 4.6 | 4.4 | 4.4 | 4.1 | 3.6 |
|  | Texture 48 hrs. after boiling | — | 4.7 | 4.5 | 4.7 | 4.3 | 3.1 |

TABLE 5-3

|  |  |  | Test product 79 | Test product 80 | Test product 81 |
|---|---|---|---|---|---|
| Improver for processed cereal food product | Content of maltol in improver | ppm | 20 | 50 | 100 |
|  | Content of 5-Hydroxymethylfurfural in improver | ppm | 20000 | 100 | 100 |
|  | Mass ratio of 5-Hydroxymethylfurfural to maltol | — | 1000 | 2 | 2 |
| Noodles | Adding amount to dried noodles | % | — | 1 | 1 |
|  | Adding amount of maltol to dried noodles | ppm | — | 0.5 | 1 |
| Sensory evaluation of noodles | Flavor immediately after boiling | — | — | 5 | 5 |
|  | Flavor 6 hrs. after boiling | — | — | 4.8 | 4.8 |
|  | Flavor 12 hrs. after boiling | — | — | 4.7 | 4.8 |
|  | Flavor 24 hrs. after boiling | — | — | 4.7 | 4.6 |
|  | Flavor 48 hrs. after boiling | — | — | 4.3 | 3.6 |
| Sensory evaluation of reheated noodles | Scent 6 hrs. after boiling | — | — | 5 | 5 |
|  | Scent 12 hrs. after boiling | — | — | 5 | 4.9 |
|  | Scent 24 hrs. after boiling | — | — | 4.9 | 4.9 |
|  | Scent 48 hrs. after boiling | — | — | 4.9 | 4.6 |
|  | Texture 48 hrs. after boiling | — | — | 4.6 | 4.5 |

TABLE 5-4

|  |  |  | Test product 82 | Test product 83 | Test product 84 |
|---|---|---|---|---|---|
| Improver for processed cereal food product | Content of maltol in improver | ppm | 250 | 500 | 1000 |
|  | Content of 5-Hydroxymethylfurfural in improver | ppm | 500 | 1000 | 2000 |
|  | Mass ratio of 5-Hydroxymethylfurfural to maltol | — | 2 | 2 | 2 |
| Noodles | Adding amount to dried noodles | % | 1 | 1 | — |
|  | Adding amount of maltol to dried noodles | ppm | 2.5 | 5 | — |
| Sensory evaluation of noodles | Flavor immediately after boiling | — | 4.5 | 4.3 | — |
|  | Flavor 6 hrs. after boiling | — | 4.3 | 4.1 | — |
|  | Flavor 12 hrs. after boiling | — | 3.4 | 4.1 | — |
|  | Flavor 24 hrs. after boiling | — | 3.4 | 3.2 | — |
|  | Flavor 48 hrs. after boiling | — | 3.2 | 3.1 | — |
| Sensory evaluation of reheated noodles | Scent 6 hrs. after boiling | — | 4.3 | 4.1 | — |
|  | Scent 12 hrs. after boiling | — | 4.2 | 4 | — |
|  | Scent 24 hrs. after boiling | — | 4 | 3.2 | — |
|  | Scent 48 hrs. after boiling | — | 3.1 | 3 | — |
|  | Texture 48 hrs. after boiling | — | 4.4 | 4.4 | — |

TABLE 6-1

|  |  |  | Comparative example 3 | Test product 85 | Test product 86 | Test product 87 | Test product 88 |
|---|---|---|---|---|---|---|---|
| Improver for processed cereal food product | Content of maltol in improver | ppm | 0 | 20 | 20 | 20 | 20 |
|  | Content of dimethyl sulfide in improver | ppm | 0 | 0 | 0.0002 | 0.001 | 0.002 |
|  | Mass ratio of dimethyl sulfide to maltol | — | 0 | 0 | 0.00001 | 0.00005 | 0.0001 |
| Noodles | Adding amount to dried noodles | % | 0 | 1 | 1 | 1 | 1 |
|  | Adding amount of maltol to dried noodles | ppm | 0 | 0.2 | 0.2 | 0.2 | 0.2 |
| Sensory evaluation of noodles | Flavor immediately after boiling | — | — | 5 | 5 | 5 | 5 |
|  | Flavor 6 hrs. after boiling | — | 2.7 | 3.6 | 4.2 | 4.6 | 4.7 |
|  | Flavor 12 hrs. after boiling | — | 2.3 | 4 | 4.1 | 4.5 | 4.7 |
|  | Flavor 24 hrs. after boiling | — | 1.6 | 2.3 | 3.3 | 4.3 | 4.5 |
|  | Flavor 48 hrs. after boiling | — | 1 | 1.5 | 3.1 | 4.2 | 4.5 |
| Sensory evaluation of reheated noodles | Scent 6 hrs. after boiling | — | 2.8 | 3.5 | 4.2 | 4.5 | 4.8 |
|  | Scent 12 hrs. after boiling | — | 2.3 | 2.3 | 4 | 4.3 | 4.7 |
|  | Scent 24 hrs. after boiling | — | 1.5 | 2.3 | 3.5 | 4.2 | 4.6 |
|  | Scent 48 hrs. after boiling | — | 1 | 1.6 | 3.2 | 4.1 | 4.5 |
|  | Texture 48 hrs. after boiling | — | 1 | 2.3 | 3.5 | 4.4 | 4.6 |

TABLE 6-2

|  |  |  | Test product 89 | Test product 90 | Test product 91 | Test product 92 | Test product 93 |
|---|---|---|---|---|---|---|---|
| Improver for processed cereal food product | Content of maltol in improver | ppm | 20 | 20 | 20 | 20 | 20 |
|  | Content of dimethyl sulfide in improver | ppm | 0.02 | 0.2 | 2 | 10 | 20 |
|  | Mass ratio of dimethyl sulfide to maltol | — | 0.001 | 0.01 | 0.1 | 0.5 | 1 |
| Noodles | Adding amount to dried noodles | % | 1 | 1 | 1 | 1 | 1 |
|  | Adding amount of maltol to dried noodles | ppm | 0.2 | 0.2 | 0.2 | 0.2 | 0.2 |
| Sensory evaluation of noodles | Flavor immediately after boiling | — | 5 | 5 | 5 | 5 | 5 |
|  | Flavor 6 hrs. after boiling | — | 4.8 | 4.8 | 4.8 | 4.7 | 4.3 |
|  | Flavor 12 hrs. after boiling | — | 4.7 | 4.7 | 4.7 | 4.5 | 4.3 |
|  | Flavor 24 hrs. after boiling | — | 4.5 | 4.6 | 4.5 | 4.2 | 3.5 |
|  | Flavor 48 hrs. after boiling | — | 4.5 | 4.5 | 4.6 | 4.1 | 3.5 |
| Sensory evaluation of reheated noodles | Scent 6 hrs. after boiling | — | 4.9 | 4.8 | 4.9 | 4.6 | 4.2 |
|  | Scent 12 hrs. after boiling | — | 4.8 | 4.6 | 4.8 | 4.4 | 4.1 |
|  | Scent 24 hrs. after boiling | — | 4.7 | 4.8 | 4.5 | 4.1 | 3.7 |
|  | Scent 48 hrs. after boiling | — | 4.7 | 4.7 | 4.5 | 4.2 | 3.5 |
|  | Texture 48 hrs. after boiling | — | 4.8 | 4.5 | 4.6 | 4.4 | 3.5 |

TABLE 6-3

|  |  |  | Test product 94 | Test product 95 | Test product 96 |
|---|---|---|---|---|---|
| Improver for processed cereal food product | Content of maltol in improver | ppm | 20 | 50 | 100 |
|  | Content of dimethyl sulfide in improver | ppm | 100 | 0.1 | 0.2 |
|  | Mass ratio of dimethyl sulfide to maltol | — | 5 | 0.002 | 0.002 |
| Noodles | Adding amount to dried noodles | % | 1 | 1 | 1 |
|  | Adding amount of maltol to dried noodles | ppm |  | 0.5 | 1 |
| Sensory evaluation of noodles | Flavor immediately after boiling | — | — | 5 | 5 |
|  | Flavor 6 hrs. after boiling | — | — | 4.9 | 4.9 |
|  | Flavor 12 hrs. after boiling | — | — | 4.7 | 4.8 |
|  | Flavor 24 hrs. after boiling | — | — | 4.7 | 4.5 |
|  | Flavor 48 hrs. after boiling | — | — | 4.6 | 4.5 |

TABLE 6-3-continued

|  |  | Test product 94 | Test product 95 | Test product 96 |
|---|---|---|---|---|
| Sensory evaluation of reheated noodles | Scent 6 hrs. after boiling | — | 5 | 5 |
|  | Scent 12 hrs. after boiling | — | 4.5 | 5 |
|  | Scent 24 hrs. after boiling | — | 4.9 | 4.9 |
|  | Scent 48 hrs. after boiling | — | 4.8 | 4.9 |
|  | Texture 48 hrs. after boiling | — | 4.7 | 4.8 |

TABLE 6-4

|  |  |  | Test product 97 | Test product 98 | Test product 99 |
|---|---|---|---|---|---|
| Improver for processed cereal food product | Content of maltol in improver | ppm | 250 | 500 | 1000 |
|  | Content of dimethyl sulfide in improver | ppm | 0.5 | 1 | 1 |
|  | Mass ratio of dimethyl sulfide to maltol | — | 0.002 | 0.002 | 0.001 |
| Noodles | Adding amount to dried noodles | % |  | 1 | 1 |
|  | Adding amount of maltol to dried noodles | ppm |  | 2.5 | 5 |
| Sensory evaluation of noodles | Flavor immediately after boiling | — |  | 4.4 | 4.2 |
|  | Flavor 6 hrs. after boiling | — |  | 4.2 | 3.9 |
|  | Flavor 12 hrs. after boiling | — |  | 3.9 | 3.7 |
|  | Flavor 24 hrs. after boiling | — |  | 3.9 | 3.1 |
|  | Flavor 48 hrs. after boiling | — |  | 3.4 | 3 |
| Sensory evaluation of reheated noodles | Scent 6 hrs. after boiling | — |  | 4.3 | 4.1 |
|  | Scent 12 hrs. after boiling | — |  | 4.2 | 3.9 |
|  | Scent 24 hrs. after boiling | — |  | 3.9 | 3.2 |
|  | Scent 48 hrs. after boiling | — |  | 3.2 | 3.1 |
|  | Texture 48 hrs. after boiling | — |  | 4.6 | 4.6 |

TABLE 7-1

|  |  |  | Comparative example 3 | Test product 100 | Test product 101 | Test product 102 | Test product 103 |
|---|---|---|---|---|---|---|---|
| Improver for processed cereal food product | Content of maltol in improver | ppm | 0 | 20 | 20 | 20 | 20 |
|  | Content of 3-methylbutanal in improver | ppm | 0 | 0 | 0.0002 | 0.001 | 0.002 |
|  | Mass ratio of 3-methylbutanal to maltol | — | 0 | 0 | 0.00001 | 0.00005 | 0.0001 |
| Noodles | Adding amount to dried noodles | % | 0 | 1 | 1 | 1 | 1 |
|  | Adding amount of maltol to dried noodles | ppm | 0 | 0.2 | 0.2 | 0.2 | 0.2 |
| Sensory evaluation of noodles | Flavor immediately after boiling | — | 5 | 5 | 5 | 5 | 5 |
|  | Flavor 6 hrs. after boiling | — | 2.8 | 3.9 | 4.4 | 4.6 | 4.9 |
|  | Flavor 12 hrs. after boiling | — | 2.1 | 2.8 | 3.9 | 4.2 | 4.7 |
|  | Flavor 24 hrs. after boiling | — | 1.5 | 2.3 | 3.7 | 4 | 4.7 |
|  | Flavor 48 hrs. after boiling | — | 1 | 1.6 | 3.5 | 3.8 | 4.5 |
| Sensory evaluation of reheated noodles | Scent 6 hrs. after boiling | — | 2.8 | 3.5 | 4.2 | 4.5 | 5 |
|  | Scent 12 hrs. after boiling | — | 2.1 | 2.8 | 4.4 | 4.4 | 4.9 |
|  | Scent 24 hrs. after boiling | — | 2 | 2.3 | 3.9 | 4.2 | 4.7 |
|  | Scent 48 hrs. after boiling | — | 1.6 | 1.6 | 3.2 | 4.2 | 4.7 |
|  | Texture 48 hrs. after boiling | — | 1 | 2.3 | 3.7 | 4.4 | 4.5 |

TABLE 7-2

|  |  |  | Test product 104 | Test product 105 | Test product 106 | Test product 107 | Test product 108 |
|---|---|---|---|---|---|---|---|
| Improver for processed cereal food product | Content of maltol in improver | ppm | 20 | 20 | 20 | 20 | 20 |
|  | Content of 3-methylbutanal in improver | ppm | 0.02 | 0.2 | 2 | 10 | 20 |

TABLE 7-2-continued

|  |  |  | Test product 104 | Test product 105 | Test product 106 | Test product 107 | Test product 108 |
|---|---|---|---|---|---|---|---|
|  | Mass ratio of 3-methylbutanal to maltol |  | — | 0.001 | 0.01 | 0.1 | 0.5 | 1 |
| Noodles | Adding amount to dried noodles | % | 1 | 1 | 1 | 1 | 1 |
|  | Adding amount of maltol to dried noodles | ppm | 0.2 | 0.2 | 0.2 | 0.2 | 0.2 |
| Sensory evaluation of noodles | Flavor immediately after boiling | — | 5 | 5 | 5 | 5 | 5 |
|  | Flavor 6 hrs. after boiling | — | 4.7 | 5 | 5 | 4.7 | 4.4 |
|  | Flavor 12 hrs. after boiling | — | 4.6 | 4.6 | 4.9 | 4.5 | 4.2 |
|  | Flavor 24 hrs. after boiling | — | 4.7 | 4.6 | 4.5 | 4.4 | 3.9 |
|  | Flavor 48 hrs. after boiling | — | 4.6 | 4.6 | 4.5 | 3.8 | 3.5 |
| Sensory evaluation of reheated noodles | Scent 6 hrs. after boiling | — | 5 | 5 | 5 | 4.6 | 4.2 |
|  | Scent 12 hrs. after boiling | — | 4.7 | 5 | 5 | 4.4 | 4.2 |
|  | Scent 24 hrs. after boiling | — | 4.6 | 4.6 | 4.9 | 4.2 | 3.9 |
|  | Scent 48 hrs. after boiling | — | 4.7 | 4.7 | 4.6 | 4.2 | 3.5 |
|  | Texture 48 hrs. after boiling | — | 4.7 | 4.6 | 4.5 | 4.4 | 3.1 |

TABLE 7-3

|  |  |  | Test product 109 | Test product 110 | Test product 111 |
|---|---|---|---|---|---|
| Improver for processed cereal food product | Content of maltol in improver | ppm | 20 | 50 | 100 |
|  | Content of 3-methylbutanal in improver | ppm | 40 | 0.05 | 0.1 |
|  | Mass ratio of 3-methylbutanal to maltol | — | 2 | 0.001 | 0.001 |
| Noodles | Adding amount to dried noodles | % |  | 1 | 1 |
|  | Adding amount of maltol to dried noodles | ppm |  | 0.5 | 1 |
| Sensory evaluation of noodles | Flavor immediately after boiling | — |  | 5 | 5 |
|  | Flavor 6 hrs. after boiling | — |  | 4.8 | 4.9 |
|  | Flavor 12 hrs. after boiling | — |  | 4.7 | 5 |
|  | Flavor 24 hrs. after boiling | — |  | 4.5 | 4.7 |
|  | Flavor 48 hrs. after boiling | — |  | 4.5 | 4.5 |
| Sensory evaluation of reheated noodles | Scent 6 hrs. after boiling | — |  | 5 | 5 |
|  | Scent 12 hrs. after boiling | — |  | 4.8 | 4.9 |
|  | Scent 24 hrs. after boiling | — |  | 4.7 | 5 |
|  | Scent 48 hrs. after boiling | — |  | 4.5 | 4.7 |
|  | Texture 48 hrs. after boiling | — |  | 4.5 | 4.6 |

TABLE 7-4

|  |  |  | Test product 112 | Test product 113 | Test product 114 |
|---|---|---|---|---|---|
| Improver for processed cereal food product | Content of maltol in improver | ppm | 250 | 500 | 1000 |
|  | Content of 3-methylbutanal in improver | ppm | 0.25 | 0.5 | 1 |
|  | Mass ratio of 3-methylbutanal to maltol | — | 0.001 | 0.001 | 0.001 |
| Noodles | Adding amount to dried noodles | % |  | 1 | 1 |
|  | Adding amount of maltol to dried noodles | ppm |  | 2.5 | 5 |
| Sensory evaluation of noodles | Flavor immediately after boiling | — |  | 4.6 | 4.2 |
|  | Flavor 6 hrs. after boiling | — |  | 4.4 | 3.9 |
|  | Flavor 12 hrs. after boiling | — |  | 3.9 | 3.5 |
|  | Flavor 24 hrs. after boiling | — |  | 3.6 | 3.1 |
|  | Flavor 48 hrs. after boiling | — |  | 3.1 | 3 |
| Sensory evaluation of reheated noodles | Scent 6 hrs. after boiling | — |  | 4.3 | 4.1 |
|  | Scent 12 hrs. after boiling | — |  | 4.2 | 3.9 |
|  | Scent 24 hrs. after boiling | — |  | 3.4 | 3.2 |
|  | Scent 48 hrs. after boiling | — |  | 3.2 | 3.1 |
|  | Texture 48 hrs. after boiling | — |  | 4.6 | 4.7 |

TABLE 8-1

|  |  |  | Comparative example 4 | Test product 115 | Test product 116 | Test product 117 | Test product 118 |
|---|---|---|---|---|---|---|---|
| Improver for processed cereal food product | Content of maltol in improver | ppm | 0 | 30 | 30 | 30 | 30 |
|  | Content of 5-Hydroxymethylfurfural in improver | ppm | 0 | 66 | 0 | 0 | 66 |
|  | Content of dimethyl sulfide in improver | ppm | 0 | 0 | 0.09 | 0.09 | 0.03 |
|  | Content of 3-methylbutanal in improver | ppm | 0 | 0 | 0 | 0.3 | 0.03 |
|  | Mass ratio of 5-Hydroxymethylfurfural to maltol | — | — | 2.2 | 0 | 0 | 2.2 |
|  | Mass ratio of dimethyl sulfide r to maltol | — | — | 0 | 0.003 | 0.003 | 0.001 |
|  | Mass ratio of 3-methylbutanal to maltol | — | — | 0 | 0 | 0.01 | 0.001 |
|  | Mass ratio of Component (B) to Component (A) | — | — | 2.2 | 0.003 | 0.013 | 2.202 |
| Noodles | Adding amount to dried noodles | % | 0 | 1 | 1 | 1 | 1 |
|  | Adding amount of maltol to dried noodles | ppm | 0 | 0.3 | 0.3 | 0.3 | 0.3 |
| Sensory evaluation of noodles | Flavor immediately after boiling | — | 5 | 5 | 5 | 5 | 5 |
|  | Flavor 6 hrs. after boiling | — | 2.8 | 4.7 | 4.8 | 4.8 | 5 |
|  | Flavor 12 hrs. after boiling | — | 2.1 | 4.7 | 4.8 | 4.8 | 4.9 |
|  | Flavor 24 hrs. after boiling | — | 1.5 | 4.7 | 4.8 | 4.8 | 4.8 |
|  | Flavor 48 hrs. after boiling | — | 1 | 4.4 | 4.2 | 4.3 | 4.8 |
|  | Strength of rice cooking oil odor immediately after boiling | — | 3.6 | 1.4 | 1.3 | 1 | 1 |
|  | Strength of oil 24 hrs. after boiling | — | 5 | 2.7 | 2.8 | 2.2 | 1 |
| Sensory evaluation of reheated noodles | Scent 6 hrs. after boiling | — | 2.8 | 5 | 5 | 5 | 5 |
|  | Scent 12 hrs. after boiling | — | 2.1 | 4.9 | 4.9 | 5 | 5 |
|  | Scent 24 hrs. after boiling | — | 1.5 | 4.7 | 4.9 | 4.9 | 4.9 |
|  | Scent 48 hrs. after boiling | — | 1 | 4.7 | 4.7 | 4.8 | 4.8 |
|  | Texture 48 hrs. after boiling | — | 1 | 4.4 | 4.5 | 4.7 | 4.9 |
|  | Strength of deteriorated odor of oil 24 hrs. after boiling | — | 5 | 2.7 | 2.8 | 2.2 | 1 |

TABLE 8-2

|  |  |  | Test product 119 | Test product 120 | Test product 121 | Test product 122 | Test product 123 |
|---|---|---|---|---|---|---|---|
| Improver for processed cereal food product | Content of maltol in improver | ppm | 30 | 30 | 10 | 10 | 10 |
|  | Content of 5-Hydroxymethylfurfural in improver | ppm | 90 | 150 | 22 | 22 | 22 |
|  | Content of dimethyl sulfide in improver | ppm | 0.09 | 0.15 | 0.01 | 0.01 | 0.01 |
|  | Content of 3-methylbutanal in improver | ppm | 0.024 | 0.3 | 0.01 | 0.01 | 0.01 |
|  | Mass ratio of 5-Hydroxymethylfurfural to maltol | — | 3 | 5 | 2.2 | 2.2 | 2.2 |
|  | Mass ratio of dimethyl sulfide r to maltol | — | 0.003 | 0.005 | 0.001 | 0.001 | 0.001 |
|  | Mass ratio of 3-methylbutanal to maltol | — | 0.0008 | 0.01 | 0.001 | 0.001 | 0.001 |
|  | Mass ratio of Component (B) to Component (A) | — | 3.0038 | 5.015 | 2.202 | 2.202 | 2.202 |
| Noodles | Adding amount to dried noodles | % | 1 | 1 | 0.1 | 0.5 | 1 |
|  | Adding amount of maltol to dried noodles | ppm | 0.3 | 0.3 | 0.01 | 0.05 | 0.1 |
| Sensory evaluation of noodles | Flavor immediately after boiling | — | 5 | 5 | 5 | 5 | 5 |
|  | Flavor 6 hrs. after boiling | — | 5 | 5 | 4.9 | 4.9 | 4.9 |
|  | Flavor 12 hrs. after boiling | — | 5 | 5 | 4.8 | 4.8 | 4.8 |
|  | Flavor 24 hrs. after boiling | — | 4.9 | 4.8 | 4.7 | 4.8 | 4.8 |
|  | Flavor 48 hrs. after boiling | — | 5 | 4.8 | 4.7 | 4.7 | 4.7 |

TABLE 8-2-continued

|  |  |  | Test product 119 | Test product 120 | Test product 121 | Test product 122 | Test product 123 |
|---|---|---|---|---|---|---|---|
|  | Strength of rice cooking oil odor immediately after boiling | — | 1 | 1 | 1.6 | 1 | 1 |
|  | Strength of oil 24 hrs. after boiling | — | 1 | 1 | 2.2 | 1.5 | 1.2 |
| Sensory | Scent 6 hrs. after boiling | — | 5 | 5 | 5 | 5 | 5 |
| evaluation | Scent 12 hrs. after boiling | — | 5 | 5 | 4.8 | 5 | 4.9 |
| of reheated | Scent 24 hrs. after boiling | — | 4.9 | 5 | 4.8 | 4.8 | 4.8 |
| noodles | Scent 48 hrs. after boiling | — | 4.9 | 5 | 4.7 | 4.7 | 5 |
|  | Texture 48 hrs. after boiling | — | 4.9 | 4.9 | 4.4 | 4.6 | 4.9 |
|  | Strength of deteriorated odor of oil 24 hrs. after boiling | — | 1 | 1 | 2.5 | 1.5 | 1.1 |

TABLE 8-3

|  |  |  | Test product 124 | Test product 125 | Test product 126 | Test product 127 | Test product 128 |
|---|---|---|---|---|---|---|---|
| Improver for processed cereal food product | Content of maltol in improver | ppm | 10 | 10 | 10 | 0.05 | 0.1 |
|  | Content of 5-Hydroxymethylfurfural in improver | ppm | 22 | 22 | 22 | 0.11 | 0.22 |
|  | Content of dimethyl sulfide in improver | ppm | 0.01 | 0.01 | 0.01 | 0.00005 | 0.0001 |
|  | Content of 3-methylbutanal in improver | ppm | 0.01 | 0.01 | 0.01 | 0.00005 | 0.0001 |
|  | Mass ratio of 5-Hydroxymethlylfurfural to maltol | — | 2.2 | 2.2 | 2.2 | 2.2 | 2.2 |
|  | Mass ratio of dimethyl sulfide r to maltol | — | 0.001 | 0.001 | 0.001 | 0.001 | 0.001 |
|  | Mass ratio of 3-methylbutanal to maltol | — | 0.001 | 0.001 | 0.001 | 0.001 | 0.001 |
|  | Mass ratio of Component (B) to Component (A) | — | 2.202 | 2.202 | 2.202 | 2.202 | 2.202 |
| Noodles | Adding amount to dried noodles | % | 10 | 20 | 50 | 20 | 10 |
|  | Adding amount of maltol to dried noodles | ppm | 1 | 2 | 5 | 0.01 | 0.01 |
| Sensory evaluation of noodles | Flavor immediately after boiling | — | 5 | 5 | 5 | 5 | 5 |
|  | Flavor 6 hrs. after boiling | — | 5 | 4.9 | 4.7 | 4.9 | 4.9 |
|  | Flavor 12 hrs. after boiling | — | 4.8 | 4.9 | 4.7 | 4.9 | 4.9 |
|  | Flavor 24 hrs. after boiling | — | 4.8 | 4.6 | 4.6 | 4.6 | 4.6 |
|  | Flavor 48 hrs. after boiling | — | 4.8 | 4.4 | 4.7 | 4.6 | 4.5 |
|  | Strength of rice cooking oil odor immediately after boiling | — | 1 | 1.5 | 1.5 | 1.4 | 1.5 |
|  | Strength of oil 24 hrs. after boiling | — | 1.1 | 1.7 | 2.4 | 2.8 | 1.5 |
| Sensory evaluation of reheated noodles | Scent 6 hrs. after boiling | — | 5 | 5 | 5 | 4.9 | 5 |
|  | Scent 12 hrs. after boiling | — | 4.9 | 4.9 | 4.8 | 4.8 | 4.9 |
|  | Scent 24 hrs. after boiling | — | 4.9 | 4.8 | 4.7 | 4.8 | 4.9 |
|  | Scent 48 hrs. after boiling | — | 4.8 | 4.7 | 4.7 | 4.7 | 4.8 |
|  | Texture 48 hrs. after boiling | — | 4.8 | 4.7 | 4.6 | 4.6 | 4.5 |
|  | Strength of deteriorated odor of oil 24 hrs. after boiling | — | 1 | 1.6 | 2.3 | 2.6 | 1.6 |

TABLE 8-4

|  |  |  | Test product 129 | Test product 130 | Test product 131 | Test product 132 | Test product 133 |
|---|---|---|---|---|---|---|---|
| Improver for processed cereal food product | Content of maltol in improver | ppm | 0.5 | 50 | 100 | 500 | 20 |
|  | Content of 5-Hydroxymethylfurfural in improver | ppm | 1.1 | 110 | 220 | 1100 | 0.2 |
|  | Content of dimethyl sulfide in improver | ppm | 0.0005 | 0.05 | 0.1 | 0.5 | 0.0002 |
|  | Content of 3-methylbutanal in improver | ppm | 0.0005 | 0.05 | 0.1 | 0.5 | 0.0002 |
|  | Mass ratio of 5-Hydroxymethlylfurfural to maltol | — | 2.2 | 2.2 | 2.2 | 2.2 | 0.01 |
|  | Mass ratio of dimethyl sulfide r to maltol | — | 0.001 | 0.001 | 0.001 | 0.001 | 0.00001 |
|  | Mass ratio of 3-methylbutanal to maltol | — | 0.001 | 0.001 | 0.001 | 0.001 | 0.00001 |
|  | Mass ratio of Component (B) to Component (A) | — | 2.202 | 2.202 | 2.202 | 2.202 | 0.01002 |
| Noodles | Adding amount to dried noodles | % | 2 | 10 | 5 | 1 | 0.05 |
|  | Adding amount of maltol to dried noodles | ppm | 0.01 | 5 | 5 | 5 | 0.01 |
| Sensory evaluation of noodles | Flavor immediately after boiling | — | 5 | 5 | 5 | 5 | 5 |
|  | Flavor 6 hrs. after boiling | — | 5 | 5 | 5 | 4.8 | 4.9 |
|  | Flavor 12 hrs. after boiling | — | 4.9 | 4.9 | 4.8 | 4.8 | 4.8 |
|  | Flavor 24 hrs. after boiling | — | 4.9 | 4.9 | 4.6 | 4.7 | 4.7 |
|  | Flavor 48 hrs. after boiling | — | 4.8 | 4.9 | 4.5 | 4.6 | 4.6 |
|  | Strength of rice cooking oil odor immediately after boiling | — | 1 | 1 | 1.5 | 1.4 | 1.4 |
|  | Strength of oil 24 hrs. after boiling | — | 1.1 | 1.1 | 1.8 | 2.7 | 2.7 |
| Sensory evaluation of reheated noodles | Scent 6 hrs. after boiling | — | 5 | 5 | 5 | 5 | 5 |
|  | Scent 12 hrs. after boiling | — | 5 | 5 | 4.9 | 4.8 | 4.9 |
|  | Scent 24 hrs. after boiling | — | 4.9 | 5 | 4.8 | 4.7 | 4.7 |
|  | Scent 48 hrs. after boiling | — | 4.8 | 4.9 | 4.7 | 4.6 | 4.7 |
|  | Texture 48 hrs. after boiling | — | 4.7 | 4.9 | 4.5 | 4.2 | 4.4 |
|  | Strength of deteriorated odor of oil 24 hrs. after boiling | — | 1 | 1.1 | 1.8 | 2.7 | 2.7 |

TABLE 8-5

|  |  |  | Test product 134 | Test product 135 | Test product 136 | Test product 137 | Test product 138 |
|---|---|---|---|---|---|---|---|
| Improver for processed cereal food product | Content of maltol in improver | ppm | 20 | 20 | 20 | 20 | 20 |
|  | Content of 5-Hydroxymethylfurfural in improver | ppm | 1 | 2 | 2000 | 5000 | 10000 |
|  | Content of dimethyl sulfide in improver | ppm | 0.001 | 0.002 | 2 | 10 | 20 |
|  | Content of 3-methylbutanal in improver | ppm | 0.001 | 0.002 | 2 | 10 | 20 |
|  | Mass ratio of 5-Hydroxymethlylfurfural to maltol | — | 0.05 | 0.1 | 100 | 250 | 500 |
|  | Mass ratio of dimethyl sulfide r to maltol | — | 0.00005 | 0.0001 | 0.1 | 0.5 | 1 |
|  | Mass ratio of 3-methylbutanal to maltol | — | 0.00005 | 0.0001 | 0.1 | 0.5 | 1 |
|  | Mass ratio of Component (B) to Component (A) | — | 0.0501 | 0.1002 | 100.2 | 251 | 502 |
| Noodles | Adding amount to dried noodles | % | 0.05 | 0.05 | 25 | 25 | 25 |
|  | Adding amount of maltol to dried noodles | ppm | 0.01 | 0.01 | 5 | 5 | 5 |
| Sensory evaluation of noodles | Flavor immediately after boiling | — | 5 | 5 | 5 | 5 | 5 |
|  | Flavor 6 hrs. after boiling | — | 4.9 | 4.9 | 5 | 4.9 | 4.9 |
|  | Flavor 12 hrs. after boiling | — | 4.9 | 4.9 | 4.8 | 4.9 | 4.8 |
|  | Flavor 24 hrs. after boiling | — | 4.5 | 4.9 | 4.7 | 4.6 | 4.7 |
|  | Flavor 48 hrs. after boiling | — | 4.5 | 4.8 | 4.6 | 4.5 | 4.6 |

TABLE 8-5-continued

|  |  | Test product 134 | Test product 135 | Test product 136 | Test product 137 | Test product 138 |
|---|---|---|---|---|---|---|
|  | Strength of rice cooking oil odor immediately after boiling | — | 1.5 | 1 | 1 | 1.5 | 1.4 |
|  | Strength of oil 24 hrs. after boiling | — | 1.6 | 1.1 | 1.1 | 1.4 | 2.7 |
| Sensory evaluation of reheated noodles | Scent 6 hrs. after boiling | — | 5 | 5 | 5 | 5 | 5 |
|  | Scent 12 hrs. after boiling | — | 4.9 | 4.9 | 5 | 4.9 | 4.8 |
|  | Scent 24 hrs. after boiling | — | 4.9 | 4.8 | 4.8 | 4.8 | 4.8 |
|  | Scent 48 hrs. after boiling | — | 4.8 | 4.7 | 4.8 | 4.8 | 4.7 |
|  | Texture 48 hrs. after boiling | — | 4.5 | 4.7 | 5 | 4.5 | 4.4 |
|  | Strength of deteriorated odor of oil 24 hrs. after boiling | — | 1.5 | 1 | 1 | 1.3 | 2.7 |

The invention claimed is:

1. A method of producing a cereal processed food product, comprising:
    adding an improver to an unprocessed cereal product or to a cereal processed food product so as to maintain a fresh flavor and/or texture,
    wherein:
        the improver contains maltol as a component (A) and at least one component selected from 5-Hydroxymethylfurfural, dimethyl sulfide, and 3-methylbutanal as a component (B),
        a mass ratio of the component (B) with respect to the component (A) is 0.01 to 500 when the component (B) consists of 5-Hydroxymethylfurfural,
        the mass ratio of the component (B) with respect to the component (A) is 0.00001 to 1.0 when the component (B) consists of dimethyl sulfide, and
        the mass ratio of the component (B) with respect to the component (A) is 0.00001 to 1.0 when the component (B) consists of 3-methylbutanal.

2. The method according to claim 1, wherein the improver is added to the unprocessed cereal product or to the cereal processed food product such that a content of maltol with respect to the unprocessed cereal product is 0.001 ppm to 20 ppm.

3. The method according to claim 1, wherein the cereal processed food product is plain cooked rice, salted rice, sushi rice, red rice, kamameshi, pasta, soba, or Chinese noodles.

4. A method of maintaining a fresh flavor and/or texture of a cereal processed food product for long term storage, or suppressing a deteriorated odor of a cereal processed food product produced with an edible oil and fat, comprising:
    adding an improver to an unprocessed cereal product or to a cereal processed food product such that a content of maltol with respect to the unprocessed cereal product is 0.001 ppm to 20 ppm,
    wherein:
        the improver contains maltol as a component (A) and at least one component selected from 5-Hydroxymethylfurfural, dimethyl sulfide, and 3-methylbutanal as a component (B),
        a mass ratio of the component (B) with respect to the component (A) is 0.01 to 500 when the component (B) consists of 5-Hydroxymethylfurfural,
        the mass ratio of the component (B) with respect to the component (A) is 0.00001 to 1.0 when the component (B) consists of dimethyl sulfide, and
        the mass ratio of the component (B) with respect to the component (A) is 0.00001 to 1.0 when the component (B) consists of 3-methylbutanal.

5. The method according to claim 1, wherein the cereal processed food product is obtained from at least one cereal selected from the group consisting of rice, wheat, barley, corn, millet, Japanese barnyard millet, Fabaceae cereal, and Polygonaceae cereal.

6. The method according to claim 1, wherein the improver contains 5-Hydroxymethylfurfural, dimethyl sulfide, and 3-methylbutanal as the component (B).

7. The method according to claim 1,
    wherein the cereal processed food product is cooked rice products, and
    wherein the adding comprises adding the improver to raw rice or cooked rice products such that a content of maltol with respect to the raw rice is 0.001 ppm to 20 ppm, and
    the method further comprises a step of washing and soaking the raw rice.

8. The method according to claim 7, further comprising a step of adding an edible oil and fat to the raw rice such that a content of the edible oil and fat with respect to the raw rice is 0.05 wt. % or more and 5.0 wt. % or less.

9. The method according to claim 1,
    wherein the cereal processed food product is noodles, and
    wherein the adding comprises adding the improver to boiled noodles such that a content of maltol with respect to dried or raw noodles is 0.001 ppm to 20 ppm.

10. The method according to claim 9, further comprising a step of adding an edible oil and fat to the boiled noodles such that a content of the edible oil and fat with respect to the boiled noodles is 0.05 wt. % or more and 5.0 wt. % or less.

11. The method according to claim 1, wherein maltol is produced by enzymatically decomposing or hydrolyzing cereals.

12. The method according to claim 1,
    wherein the improver is a liquid improver, and
    the method further comprises a step of mixing and stirring a liquid that contains the component (A) and the component (B) at a temperature of 35° C. or more and 100° C. or less to produce the liquid improver.

* * * * *